United States Patent
Fan

(10) Patent No.: US 10,818,906 B2
(45) Date of Patent: Oct. 27, 2020

(54) NEGATIVE THERMAL EXPANSION CURRENT INTERRUPTER

(71) Applicant: American Lithium Energy Corporation, Carlsbad, CA (US)

(72) Inventor: Jiang Fan, San Diego, CA (US)

(73) Assignee: American Lithium Energy Corporation, Carlsbad, CA (US)

( * ) Notice: Subject to any disclaimer, the term of this patent is extended or adjusted under 35 U.S.C. 154(b) by 27 days.

(21) Appl. No.: 15/968,346

(22) Filed: May 1, 2018

(65) Prior Publication Data

US 2018/0315988 A1    Nov. 1, 2018

Related U.S. Application Data

(60) Provisional application No. 62/492,827, filed on May 1, 2017.

(51) Int. Cl.
*H01M 2/34* (2006.01)
*H01M 4/38* (2006.01)
(Continued)

(52) U.S. Cl.
CPC ........... *H01M 2/348* (2013.01); *H01H 37/46* (2013.01); *H01M 4/382* (2013.01);
(Continued)

(58) Field of Classification Search
CPC .... H01M 2/348; H01M 10/637; H01M 4/382; H01M 8/04701; H01M 10/052;
(Continued)

(56) References Cited

U.S. PATENT DOCUMENTS 4,075,400 A    2/1978    Fritts
4,456,631 A    6/1984    Crosbie et al.
(Continued)

FOREIGN PATENT DOCUMENTS

EP    0450549 A1    10/1991
EP    0776058 A2    5/1997
(Continued)

OTHER PUBLICATIONS

D.J. Fisher, Negative Thermal Expansion Materials, Jan. 15, 2018, Materials Research Forum LLC, p. 7, p. 86 (Year: 2018).*
(Continued)

*Primary Examiner* — Matthew J Merkling
(74) *Attorney, Agent, or Firm* — Mintz Levin Cohn Ferris Glovsky and Popeo, P.C.

(57) ABSTRACT

An electric power system such as, for example, a circuit, an electric appliance, an electric generator, and/or an energy storage system, can be coupled with a negative thermal expansion component. The negative thermal expansion component can be formed from a material having negative thermal expansion properties such that the negative thermal expansion component contracts in response to an increase in temperature. The contraction of the negative thermal expansion component can form a nonconductive gap that disrupts current flow through the electric power system. The disruption of the current flow can eliminate hazards associated with the electric power system overcharging, overheating, and/or developing an internal short circuit.

9 Claims, 14 Drawing Sheets

(51) Int. Cl.
*H01M 10/052* (2010.01)
*H01M 8/04701* (2016.01)
*H01M 10/637* (2014.01)
*H01H 37/46* (2006.01)
*H01M 4/02* (2006.01)
*H01H 37/36* (2006.01)

(52) U.S. Cl.
CPC ..... *H01M 8/04701* (2013.01); *H01M 10/052* (2013.01); *H01M 10/637* (2015.04); *H01H 37/36* (2013.01); *H01M 2004/028* (2013.01); *H01M 2200/103* (2013.01)

(58) Field of Classification Search
CPC ...... H01M 2004/028; H01M 2200/103; H01H 37/46; H01H 37/36
See application file for complete search history.

(56) References Cited

U.S. PATENT DOCUMENTS

| | | | |
|---|---|---|---|
| 4,541,735 A | | 9/1985 | Abu-Isa |
| 4,975,341 A | * | 12/1990 | Tucholski ............... H01M 2/34 429/54 |
| 5,504,128 A | | 4/1996 | Mizutani et al. |
| 5,507,842 A | | 4/1996 | Fiorino |
| 5,776,627 A | | 7/1998 | Mao et al. |
| 6,181,545 B1 | | 1/2001 | Amatucci et al. |
| 6,387,570 B1 | | 5/2002 | Nakamura et al. |
| 6,576,373 B1 | | 6/2003 | Iwamoto et al. |
| 6,780,544 B2 | | 8/2004 | Noh |
| 7,203,049 B2 | | 4/2007 | Chu et al. |
| 7,390,589 B2 | | 6/2008 | Shin et al. |
| 8,021,788 B2 | | 9/2011 | Kim et al. |
| 8,841,011 B2 | | 9/2014 | Jang |
| 9,627,722 B1 | | 4/2017 | Fan et al. |
| 9,806,382 B1 | | 10/2017 | Fan et al. |
| 2005/0079422 A1 | | 4/2005 | Ko et al. |
| 2006/0099506 A1 | | 5/2006 | Krause et al. |
| 2007/0166609 A1 | | 7/2007 | Lee et al. |
| 2007/0210893 A1 | | 9/2007 | Hasunuma et al. |
| 2007/0269718 A1 | | 11/2007 | Krause et al. |
| 2008/0116423 A1 | | 5/2008 | Fan et al. |
| 2008/0241684 A1 | | 10/2008 | Muraoka et al. |
| 2008/0254343 A1 | | 10/2008 | Kaolin et al. |
| 2008/0292939 A1 | | 11/2008 | Xie |
| 2009/0027158 A1 | | 1/2009 | Kajino et al. |
| 2010/0047674 A1 | | 2/2010 | Ryu et al. |
| 2010/0099022 A1 | | 4/2010 | Nishida et al. |
| 2010/0167107 A1 | | 7/2010 | Byun et al. |
| 2010/0247987 A1 | | 9/2010 | Holung et al. |
| 2011/0045321 A1 | | 2/2011 | Park et al. |
| 2011/0052950 A1 | | 3/2011 | Yoo |
| 2011/0117403 A1 | | 5/2011 | Hermann et al. |
| 2011/0151293 A1 | | 6/2011 | Kim et al. |
| 2011/0157755 A1 | | 6/2011 | Honkura |
| 2011/0256443 A1 | | 10/2011 | Park et al. |
| 2011/0273807 A1 | | 11/2011 | Kim et al. |
| 2011/0273809 A1 | | 11/2011 | Falsett et al. |
| 2012/0056709 A1 | | 3/2012 | Kajino et al. |
| 2012/0068127 A1 | | 3/2012 | Kawase et al. |
| 2012/0121974 A1 | | 5/2012 | Tikhonov et al. |
| 2012/0189881 A1 | | 7/2012 | Geoffroy et al. |
| 2013/0004811 A1 | | 1/2013 | Banerjee et al. |
| 2013/0101869 A1 | | 4/2013 | Farmer |
| 2013/0130075 A1 | | 5/2013 | Kim et al. |
| 2013/0171502 A1 | | 7/2013 | Chen et al. |
| 2013/0216867 A1 | | 8/2013 | Schaefer et al. |
| 2014/0072851 A1 | | 3/2014 | Oh et al. |
| 2014/0168845 A1 | | 6/2014 | Charles |
| 2014/0178753 A1 | | 6/2014 | Chu et al. |
| 2014/0377629 A1 | | 12/2014 | Miyazaki et al. |
| 2015/0104681 A1 | | 4/2015 | Wang et al. |
| 2015/0280241 A1 | | 10/2015 | Hara et al. |
| 2015/0303484 A1 | | 10/2015 | Iida et al. |
| 2015/0311001 A1 | | 10/2015 | Kato et al. |
| 2016/0059732 A1 | | 3/2016 | Loftus |
| 2016/0149196 A1 | | 5/2016 | Fan et al. |
| 2016/0149199 A1 | | 5/2016 | Fan |
| 2016/0149268 A1 | | 5/2016 | Fan et al. |
| 2016/0149269 A1 | | 5/2016 | Fan et al. |
| 2016/0164065 A1 | | 6/2016 | Liu et al. |
| 2016/0172657 A1 | | 6/2016 | Matsui et al. |
| 2016/0181590 A1 | | 6/2016 | Fan et al. |
| 2016/0240836 A1 | | 8/2016 | Aotani et al. |
| 2016/0254545 A1 | | 9/2016 | Sugita et al. |
| 2016/0268646 A1 | | 9/2016 | Wang et al. |
| 2016/0322641 A1 | | 11/2016 | Saito et al. |
| 2016/0365613 A1 | | 12/2016 | Fan |
| 2016/0380307 A1 | | 12/2016 | Akita et al. |
| 2017/0069904 A1 | | 3/2017 | Ishihara et al. |
| 2017/0207440 A1 | | 7/2017 | Hama et al. |
| 2017/0244093 A1 | | 8/2017 | Fan |
| 2017/0365840 A1 | | 12/2017 | Fan et al. |
| 2018/0019505 A1 | | 1/2018 | Fan et al. |
| 2018/0053928 A1 | | 2/2018 | Xie et al. |
| 2018/0190967 A1 | | 7/2018 | Fan et al. |
| 2018/0294472 A1 | | 10/2018 | Fan |
| 2019/0013553 A1 | | 1/2019 | Fan et al. |
| 2019/0058198 A1 | | 2/2019 | Fan et al. |
| 2019/0081315 A1 | * | 3/2019 | Morin ................ H01M 2/1613 |

FOREIGN PATENT DOCUMENTS

| | | |
|---|---|---|
| EP | 1246280 A2 | 10/2002 |
| JP | 7220755 A2 | 8/1995 |
| JP | H07-220755 A | 8/1995 |
| JP | H09 320568 A | 12/1997 |
| JP | 2000-077061 A | 3/2000 |
| JP | 2005-011540 A | 1/2005 |
| JP | 2007-280803 A | 10/2007 |
| JP | 2010-146726 A | 7/2010 |
| KR | 20130123492 A | 11/2013 |
| WO | WO-2004/049494 A1 | 6/2004 |
| WO | WO-2015/046469 A1 | 4/2015 |
| WO | WO-2015/060175 A1 | 4/2015 |
| WO | WO-2016/086184 A1 | 6/2016 |

OTHER PUBLICATIONS

Eichstadt, Amy E., et al. "Structure-Property Relationships fora Series of Amorphous Partially Aliphatic Polyimides." *Journal of Polymer Science Part B: Polymer Physics* 40.14 (2002): 1503-1512.

Fang, Xingzhong, et al. "Synthesis and properties of polyimides derived from cis-and trans-1, 2, 3, 4-cyclohexanetetracarboxylic dianhydrides." *Polymer* 45.8 (2004): 2539-2549.

Jeon, Jong-Young, and Tae-Moon Tak. "Synthesis of Aliphatic-Aromatic Polyimides by Two-Step Polymerization of Aliphatic Dianhydride and Aromatic Diamine." *Journal of Applied Polymer Science* 60.11 (1996): 1921-1926.

Loncrini, D. F., and J. M. Witzel. "Polyaryleneimides of meso- and dl-1, 2, 3, 4-Butanetetracarboxylic Acid Dianhydrides." *Journal of Polymer Science Part A-1: Polymer Chemistry* 7.8 (1969): 2185-2193.

Matsumoto, Toshihiko. "Aliphatic polyimides derived from polyalicyclic monomers." *High Performance Polymers* 13.2 (2001): S85-S92.

Schab-Balcerzak, E., et al. "Synthesis and characterization of organosoluble aliphatic-aromatic copolyimides based on cycloaliphatic dianhydride." *European Polymer Journal* 38.3 (2002): 423-430.

Seino, Hiroshi, Amane Mochizuki, and Mitsuru Ueda. "Synthesis of Aliphatic Polyimides Containing Adamantyl Units." *Journal of Polymer Science Part A Polymer Chemistry* 37.18 (1999): 3584-3590.

Seino, Hiroshi, et al. "Synthesis of fully aliphatic polyimides." *High Performance Polymers* 11.3 (1999): 255-262.

Spotnitz, R., and J. Franklin. "Abuse behavior of high-power, lithium-ion cells." *Journal of Power Sources* 113.1 (2003): 81-100.

International Search Report and Written Opinion issued in International Application No. PCT/US2015/062767, dated Feb. 12, 2016. 14 pages.

\* cited by examiner

| Discharge Current | Discharge Capacity (mAh) | Capacity at different C rates/Capacity at 0.2C rate |
|---|---|---|
| 0.2C (0.2A) | 1023.12 | 1 |
| 0.5C (0.5A) | 1003.52 | 0.98 |
| 1C (1A) | 964.32 | 0.96 |
| 2C (2A) | 847.7 | 0.88 |

FIG. 9

| Discharge Current | Discharge Capacity (mAh) | Capacity at different C rates/Capacity at 0.5C rate |
|---|---|---|
| 0.5C (1A) | 1775 | 1 |
| 1.5C (3A) | 1583 | 0.89 |

FIG. 12

| Materials | $\alpha$ (ppm K$^{-1}$) | $T_{oper}$ (K) | Category | Method$^a$ | References |
|---|---|---|---|---|---|
| β-eucryptite | −1 to −6$^b$ | 300–800 | 1 | D | [1, 4, 15] |
| α-ZrW$_2$O$_8$ | −9 | <425 | 1 | D/N | [20] |
| β-ZrW$_2$O$_8$ | −6 | 425–1030 | 1 | D/N | [20] |
| Cd(CN)$_2$ | −33.5 | 170–375 | 1 | X | [27] |
| ReO$_3$ | −0.5 | 220 | 1 | N | [10] |
| ReO$_3$ | −0.7 | 600–680 | 1$^b$ | N | [10] |
| (HfMg)(WO$_4$)$_3$ | −2$^b$ | Room temp. ~1070 | 1 | D | [11] |
| Sm$_{2.75}$C$_{60}$ | −100$^b$ | <30 | 2 | X | [29] |
| Bi$_{0.95}$La$_{0.05}$NiO$_3$ | −82$^b$ | 320 ~ 380 | 2 | D | [35] |
| Invar (Fe–36Ni) | 0.1–1 | <500 | 3 | D | [37, 38] |
| Invar (Fe$_3$Pt) | −6 to −30 | 100–420 | 3 | D | [49, 50] |
| Tm$_2$Fe$_{16}$Cr | −9$^b$ | 340–380 | 3 | D | [47] |
| CuO nano particles | −36$^b$ | <150 | 3$^b$ | X | [48] |
| Mn$_3$Cu$_{0.53}$Ge$_{0.47}$N | −16 | 265–340 | 3 | D | [73] |
| Mn$_3$Zn$_{0.4}$Sn$_{0.6}$Na$_{0.5}$Co$_{0.15}$ | −23 | 270–335 | 3 | D | [75] |
| Mn$_3$Zn$_{0.5}$Sn$_{0.5}$N$_{0.85}$Co$_{0.1}$B$_{0.05}$ | −30 | 280–340 | 3 | D | [76] |

$^a$ D, dilatometry; N, neutron diffraction; X, x-ray diffraction.
$^b$ The thermal expansion is anisotropic and $\alpha$ is the averaged value.
$^c$ Details of the mechanism are unknown. The classification is temporary (see text).

FIG. 14

NEGATIVE THERMAL EXPANSION CURRENT INTERRUPTER

RELATED APPLICATION

This application claims priority to U.S. Provisional Patent Application No. 62/492,827 filed on May 1, 2017 and entitled BATTERY WITH INTERNAL NEGATIVE THERMAL EXPANSION CURRENT INTERRUPTER, the disclosure of which is incorporated herein by reference in its entirety.

TECHNICAL FIELD

The subject matter described herein relates generally to electric power systems and more specifically to a negative thermal expansion current interrupter for electric power systems.

BACKGROUND

An electric power system can encounter a number of risks during operation including, for example, overheating, overcharging, short circuiting, and/or the like. For instance, overcurrent can refer to a situation in which a larger than intended current flows through an electric power system such as, for example, a circuit, an electric appliance, an electric generator, an energy storage system, and/or the like. Overcurrent can occur due to current overload, short circuits, design flaws, ground faults, arc faults, and/or the like. The heat generated by the excess current can pose significant risks including, for example, fires, explosions, and damage to the electric power system.

SUMMARY

Systems, methods, and articles of manufacture, including batteries and battery components, are provided. In some implementations of the current subject matter, there is provided a battery. The battery can include a first current interrupter. The first current interrupter can include a negative thermal expansion material such that the first current interrupter contracts in response to an increase in temperature. The contraction of the first current interrupter can form a nonconductive gap within the battery. The formation of the nonconductive gap can disrupt a current flow within the battery.

In some variations, one or more features disclosed herein including the following features can optionally be included in any feasible combination. The battery can further include a first electrode. The first current interrupter can be disposed on a surface of the first electrode.

In some variations, the battery can further include a current collector. The first current interrupter can be interposed between the first electrode and the current collector. The formation of the nonconductive gap can disrupt the current flow at least by electrically decoupling the first electrode and the current collector.

In some variations, the battery can further include a second electrode and a second current interrupter. The second current interrupter can be interposed between the first electrode and the second electrode. The second interrupter can include the negative thermal material such that the second current interrupter contracts in response to an increase in temperature. The contraction of the second current interrupter can form another nonconductive gap within the battery. The formation of the other nonconductive gap can further disrupt the current flow at least by electrically decoupling the first electrode and the second electrode.

In some variations, the battery can further include a separator. The current interrupter can be interposed between the separator and the first electrode. The formation of the nonconductive gap can disrupt the current flow at least by electrically decoupling the separator and the first electrode.

In some variations, the negative thermal expansion material can include one or more oxides. The negative thermal expansion material can include a silicate, a zirconium tungstate, a cyanide, a ruthenate, a siliceous faujasite, $Fe_3Pt$, a perovskite oxides, an antiperovskite, a zeolite, a samarium fulleride, $LaCu_3Fe_4O_{12}$, an invar alloy, a metal oxide, a low-dimensional material, a metal fluoride, a mechanoresponsive polymer, a porous polyacrylamide, a dibenzocyclooctadiene (DBCOD), and/or a polyacrylamide film containing dibenzocyclooctadiene (DBCOD). The negative thermal expansion material can include a composite of one or more negative thermal expansion materials.

In some variations, the first electrode can be a cathode or an anode of the battery. The first electrode can include lithium (Li).

In some implementations of the current subject matter, there is provided a fuse. The fuse can include a negative thermal expansion plate interposed between a first metal plate and a second metal plate. The negative thermal expansion plate can include a negative thermal expansion material such that at least a portion of the negative thermal expansion plate can contract in response to an increase in temperature. The contraction of the negative thermal expansion plate can form a nonconductive gap between the first metal plate and the second metal plate. The formation of the nonconductive gap can disrupt a current flow through an electric power system coupled with the fuse.

In some variations, the negative thermal expansion plate can include a nonconductive material configured to provide structural support. The nonconductive material can include a positive temperature coefficient material such that another portion of the negative thermal expansion plate undergoes a phase transition in response to a temperature exceeding a threshold value. The phase transition can cause the other portion of the negative thermal expansion plate to expand. The nonconductive gap can be further formed by the expansion of the other portion of the negative thermal expansion plate.

In some variations, the positive temperature coefficient material can include poly ethylene, polyvinylidene fluoride (PVDF), acrylonitrile butadiene styrene (ABS) thermoplastic, glass and/or fiber-reinforced acrylonitrile butadiene styrene (ABS), acetal, amber, benzocyclobutene, cellulose acetate (CA), cellulose acetate butynate (CAB), cellulose nitrate (CN), chlorinated polyether, chlorinated polyvinylchloride (CPVC), ethylene ethyl acrylate (EEA), ethylene vinyl acetate (EVA), fluoroethylene propylene (FEP), fluorspar, $CaF_2$, gutta percha, nylon molding and/or extruding compound, paraffin, polybutylene (PB), polyamide (PA), polyester, and/or polypropylene (PP).

In some variations, the electric power system can be a circuit, an electric appliance, an electric generator, and/or an energy storage system. The fuse can be disposed on an interior of the electric power system. The fuse can be coupled with the electric power system via an external connection.

In some variations, the negative thermal expansion material can include one or more oxides. The negative thermal expansion material can include a silicate, a zirconium tungstate, a cyanide, a ruthenate, a siliceous faujasite, $Fe_3Pt$, a perovskite oxides, an antiperovskite, a zeolite, a samarium fulleride, $LaCu_3Fe_4O_{12}$, an invar alloy, a metal oxide, a low-dimensional material, a metal fluoride, a mechanoresponsive polymer, a porous polyacrylamide, a dibenzocyclooctadiene (DBCOD), and/or a polyacrylamide film containing dibenzocyclooctadiene (DBCOD). The negative thermal expansion material can include a composite of one or more negative thermal expansion materials.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to web application user interfaces, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 9 depicts a table illustrating cell capacity at different discharge rates for a battery cell having a negative thermal expansion component consistent with implementations of the current subject matter;

FIG. 12 depicts a table illustrating cell capacity at different discharge rates for a reference battery cell without a negative thermal expansion component consistent with implementations of the current subject matter;

FIG. 14 depicts a table illustrating examples of negative temperature expansion materials consistent with implementations of the current subject matter.

When practical, similar reference numbers denote similar structures, features, or elements.

DETAILED DESCRIPTION

Figure 1:
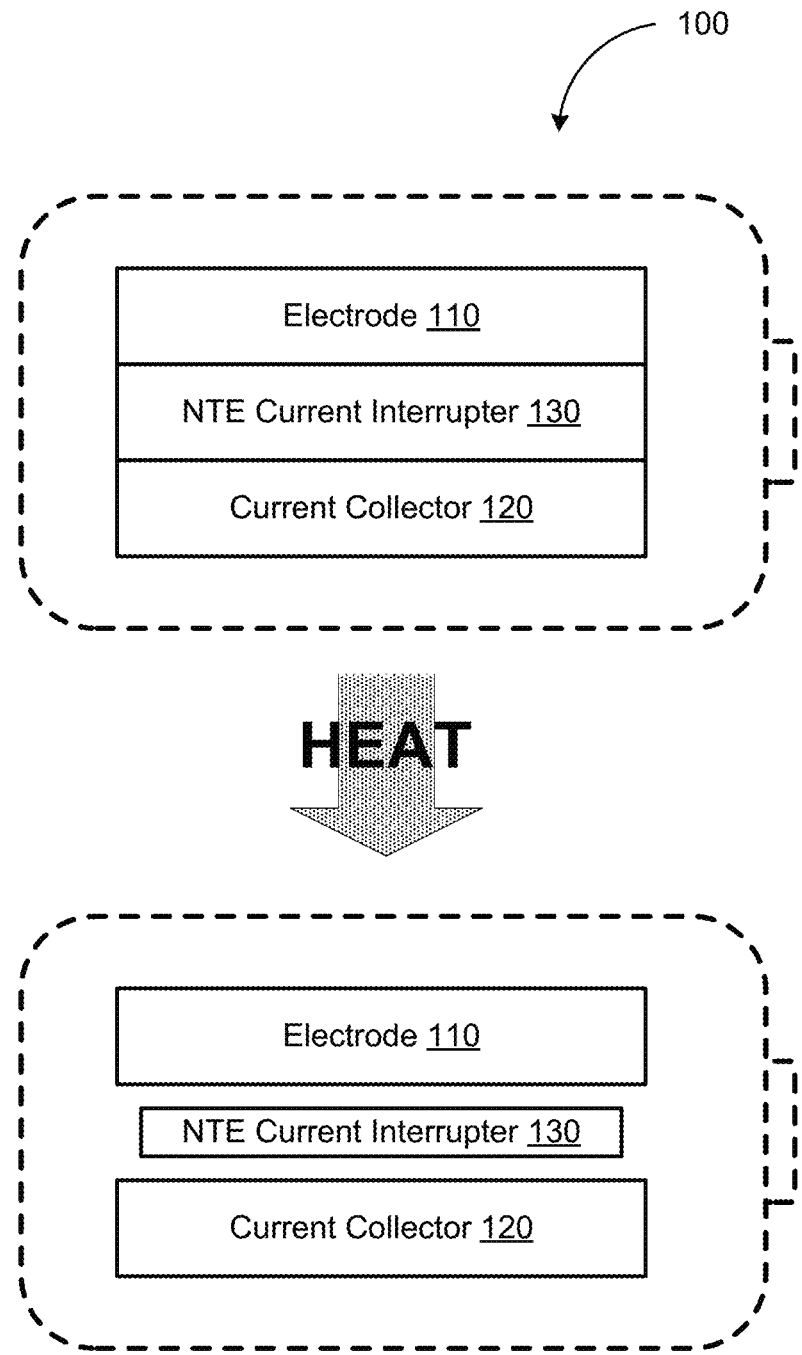
FIG. 1 depicts a schematic diagram illustrating an example of a battery cell having a negative thermal expansion component consistent with implementations of the current subject matter.

An electric power system can overcharge, overheat, and/or short circuit during operation. For example, overcurrent can occur in an energy storage system such as, for example, a battery cell, when the battery cell is overcharged and/or develops an internal short circuit. The battery cell can develop an internal short circuit as the result of compressive shocks to the battery cell and/or the growth of dendrites that form a low impedance path between the electrodes of the battery cell. Meanwhile, the battery cell can become overcharged when excess current is applied to battery cell, for example, when the battery cell is in a fully charged state. Both the internal short circuit and overcharging can cause irreversible damage to the battery cell. Furthermore, the internal short circuit and overcharging can lead to thermal runaway, a hazardous condition in which undissipated heat from the overheating battery cell accelerates exothermic reactions within the battery cell to further increase the temperature of the battery. The consequences of thermal runaway can be especially dire including, for example, fire, explosions, and/or the like. As such, in some implementations of the current subject matter, an electric power system can be coupled with a negative thermal expansion component for eliminating the hazards associated with the electric power system overheating, overcharging, and/or short circuiting.

In some implementations of the current subject matter, the negative thermal expansion component can be formed from a material having negative thermal expansion properties. For example, the negative thermal expansion component can contract when subject to a temperature increase. The contraction of the negative thermal expansion component can create a nonconductive gap that interrupt the flow of current through the electric power system. As such, the negative thermal expansion component can prevent the electric power system from being exposed to excess current. In doing so, the negative thermal expansion component can eliminate the hazards associated with overcurrent including, for example, fires, explosions, and/or damage to the electric power system.

In some implementations of the current subject matter, the negative thermal expansion component can be integrated into the electric power system which, as noted, can be a circuit, an electric appliance, an electric generator, an energy storage system, and/or the like. For example, the negative thermal expansion component can include one or more layers of negative thermal expansion material disposed between the electrodes, the current collectors, and/or the separator of a battery cell. Alternatively and/or additionally, the negative thermal expansion component can be implemented as a fuse, which can be deployed on an interior and/or an exterior of the electric power system. As noted, the negative thermal expansion component can contract upon exposure to a temperature increase. The contraction of the negative thermal expansion component can form a nonconductive gap that interrupts a flow of current through the electric power system.

As noted, the negative thermal expansion component can be formed from a material having negative thermal expansion properties. According to some implementations of the current subject matter, the negative thermal expansion component can be formed from one or more oxides exhibiting negative thermal expansion properties. It should be appreciated that oxides can withstand extremely high voltage, for example, in excess of 10,000 volts, without undergoing structural degradation. As such, the negative thermal expansion component can be deployed in high voltage applications including, for example, electric vehicles, power grids, and/or the like.

In some implementations of the current subject matter, the negative thermal expansion component can be formed from a silicate (e.g., $LiAlSiO_4$ (β-eucryptite), $Li_2Al_2Si_nO_{4+2n}$ (β-spodumenes), $Mg_2Al_4Si_5O_{18}$ (cordierite), and/or the like), zirconium tungstate (e.g., $ZrW_2O_8$, $ZrW_2O_7$, and/or the like), cyanides (e.g., $Cd(CN)_2$, $ReO_3$, $(HfMg)(WO_4)_3$, and/or the like), ruthenate ($Ca_2RuO_{4-y}$), siliceous faujasite, $Fe_3Pt$, perovskite oxides (e.g., nickel-based perovskite oxide $Bi_{0.95}La_{0.05}NiO_3$ and/or the like), antiperovskites (e.g., $Ni_3AX$, $Ni_3MgC$, $Ni_3ZnN_{1-\delta}$, and/or the like), zeolites, samarium fulleride ($Sm_{2.75}C_{60}$), $LaCu_3Fe_4O_{12}$, invar alloys (e.g., Fe—Ni—Co and/or the like), metal oxides (e.g., $AM_2O_8$, $AM_2O_7$, $A_2M_3O_{12}$, and/or the like), low-dimensional materials (e.g., zero-dimensional fullerene and clusters, one-dimensional carbon nanotubes, and two-dimensional graphite and/or graphene, and/or the like), metal fluorides (e.g., $ScF_3$ and/or the like), mechanoresponsive polymers, porous polyacrylamide (PAAM), dibenzocyclooctadienes (DBCOD), a polyacrylamide film containing dibenzocyclooctadiene (DBCOD), and/or the like. Alternatively and/or additionally, the negative thermal expansion component can be formed from a composite containing at least one negative thermal expansion material including, for example, $ZrW_2O_8$/copper, $ZrW_2O_8$/aluminum, $ZrW_2O_8$/phenolic resin, $ZrW_2O_8$/polyimide, β-eucryptite/copper, and/or the like.

For example, perovskite oxide ($Bi_{0.95}La_{0.05}NiO_3$) can exhibit a negative thermal expansion coefficient of −82 ppm $K^{-1}$ when subject to temperatures $T_{oper}$ between 320 kelvins (K) and 380 kelvins (K). A negative thermal expansion component formed from perovskite oxide ($Bi_{0.95}La_{0.05}NiO_3$) and having an original length of 1 millimeter can contract and form a 8.2 micrometer nonconductive gap upon being subject to a temperature increase of 100 kelvins (K). Alternatively and/or additionally, dibenzocyclooctadienes (DBCOD) and/or a polyacrylamide film containing dibenzocyclooctadiene (DBCOD) can be associated with a negative thermal expansion coefficient of −1200 ppm $K^{-1}$ at ambient and/or near ambient temperatures. Thus, a negative thermal expansion component formed from dibenzocyclooctadienes (DBCOD) and/or a polyacrylamide film containing dibenzocyclooctadiene (DBCOD) and having an original length of 1 millimeter can contract and form a 120 micrometer nonconductive gap when subject to a temperature increase of 100 kelvins (K). As noted, the formation of a nonconductive gap can disrupt current flow through an electric power system (e.g., a circuit, an electric appliance, an electric generator, an energy storage system, and/or the like), thereby prevent a thermal runaway when the electric power system is exposed to a surge in voltage, current, and/or temperature.

It should be appreciated that the nonconductive gap can also be formed by gas and/or liquids released by the current interrupter. Alternately and/or additionally, the nonconductive gap can be formed by the decomposition of the current interrupter. Batteries that include current interrupters that release gas and/or liquids and/or decompose are described in International Patent Publication No. WO 2016/086184, the disclosure of which is incorporated herein by reference.

FIG. 1 depicts a schematic diagram illustrating an example of a battery cell 100 having a negative thermal expansion component consistent with implementations of the current subject matter. As shown in FIG. 1, the battery cell 100 can include an electrode 110 and a current collector 120. The electrode 110 can be an anode and/or a cathode of the battery cell 100. Although not shown, the battery cell 100 can include another current collector and another electrode having an opposite polarity as the electrode 110.

Referring again to FIG. 1, the battery cell 100 can include a negative thermal expansion component. For instance, in some implementations of the current subject matter, the negative thermal expansion component can be a negative thermal expansion current interrupter 130 interposed between the electrode 110 and the current collector 120. As shown in FIG. 1, subjecting the battery cell 100 to heat can cause the negative thermal expansion current interrupter 130 to contract. For example, the temperature of the battery cell 100 can increase when the battery cell 100 overcharges, overheats, and/or develops an internal short circuit. The negative thermal expansion current interrupter 130 can respond to the increase in temperature by contracting. For instance, the negative thermal expansion current interrupter 130 can contract isotropically or uniformly in all directions. Alternatively and/or additionally, the negative thermal expansion current interrupter 130 can contract anisotropically or non-uniformly in different directions. It should be appreciated that the manner in which the negative thermal expansion current interrupter 130 contracts (e.g., isotropically and/or anisotropically) can depend on a design (e.g., dimensions, shape, and/or the like) of the negative thermal expansion current interrupter 130 and/or the materials used to form the negative thermal expansion current interrupter 130.

In some implementations of the current subject matter, the contraction of the negative thermal expansion current interrupter 130 can form a nonconductive gap between the electrode 110 and the current collector 120. For example, the nonconductive gap can be formed when the contracting negative thermal expansion current interrupter 130 at least partially detaches from the electrode 110 and/or the current collector 120, thereby electrically decoupling the electrode 110 and the current collector 120. It should be appreciated that the nonconductive gap can be full and/or a partial gap between the electrode 110 and the current collector 120. Furthermore, the nonconductive gap can also be formed by gas and/or liquids released by the negative thermal expansion current interrupter 130. Alternatively and/or additionally, the nonconductive gap can be formed due a decomposition of the negative thermal expansion current interrupter 130. The presence of the nonconductive gap between the electrode 110 and the current collector 120 can interrupt a flow of current through the battery cell 100, thereby neutralizing the risks associated with overcurrent.

In some implementations of the current subject matter, the negative thermal expansion current interrupter 130 can be formed from a material having negative thermal expansion properties including, for example, one or more oxides. For example, the negative thermal expansion current interrupter 130 can be formed from a silicate (e.g., $LiAlSiO_4$ (β-eucryptite), $Li_2Al_2SinO_{4+2n}$ (β-spodumenes), $Mg_2Al_4Si_5O_{18}$ (cordierite), and/or the like), zirconium tungstate (e.g., $ZrW_2O_8$, $ZrW_2O_7$, and/or the like), cyanides (e.g., $Cd(CN)_2$, $ReO_3$, $(HfMg)(WO_4)_3$, and/or the like), ruthenate ($Ca_2RuO_{4-y}$), siliceous faujasite, $Fe_3Pt$, perovskite oxides (e.g., nickel-based perovskite oxide $Bi_{0.95}La_{0.05}NiO_3$ and/or the like), antiperovskites (e.g., $Ni_3AX$, $Ni_3MgC$, $Ni_3ZnN_{1-\delta}$, and/or the like), zeolites, samarium fulleride ($Sm_{2.75}C_{60}$), $LaCu_3Fe_4O_{12}$, invar alloys (e.g., Fe—Ni—Co and/or the like), metal oxides (e.g., $AM_2O_8$, $AM_2O_7$, $A_2M_3O_{12}$, and/or the like), low-dimensional materials (e.g., zero-dimensional fullerene and clusters, one-dimensional carbon nanotubes, and two-dimensional graphite and/or graphene, and/or the like), metal fluorides (e.g., $ScF_3$ and/or the like), mechanoresponsive polymers, porous polyacrylamide (PAAM), dibenzocyclooctadienes (DBCOD), a polyacrylamide film containing dibenzocyclooctadiene (DBCOD), and/or the like. Alternatively and/or additionally, the negative thermal expansion current interrupter 130 can be formed from a composite containing at least one negative thermal expansion material including, for example, $ZrW_2O_8$/copper, $ZrW_2O_8$/aluminum, $ZrW_2O_8$/phenolic resin, $ZrW_2O_8$/polyimide, β-eucryptite/copper, and/or the like. Other examples of materials exhibiting negative thermal expansion properties are shown in FIG. 14, which depicts a table 1500 illustrating examples of negative thermal expansion materials consistent with implementations of the current subject matter.

In some implementations of the current subject matter, the battery cell 100 can be a lithium (Li) ion battery. The negative thermal expansion current interrupter 130 can be formed by coating a mixture of 90% $ScF_3$, 5% carbon black, and 5% polyvinylidene fluoride (PVDF) onto aluminum (Al) foil with a loading of 2 milligrams per square centimeter ($mg/cm^2$). The electrode 110 can be a lithium (e.g., $LiCoO_2$) cathode of the battery cell 110, which can be formed by coating a mixture of 5% plasma chemical vapor deposition (PCVD) and 5% carbon additive atop a $ScF_3$ surface. Alternatively and/or additionally, the electrode 110 can be a graphite (C) anode of the battery cell 100.

Figure 2:
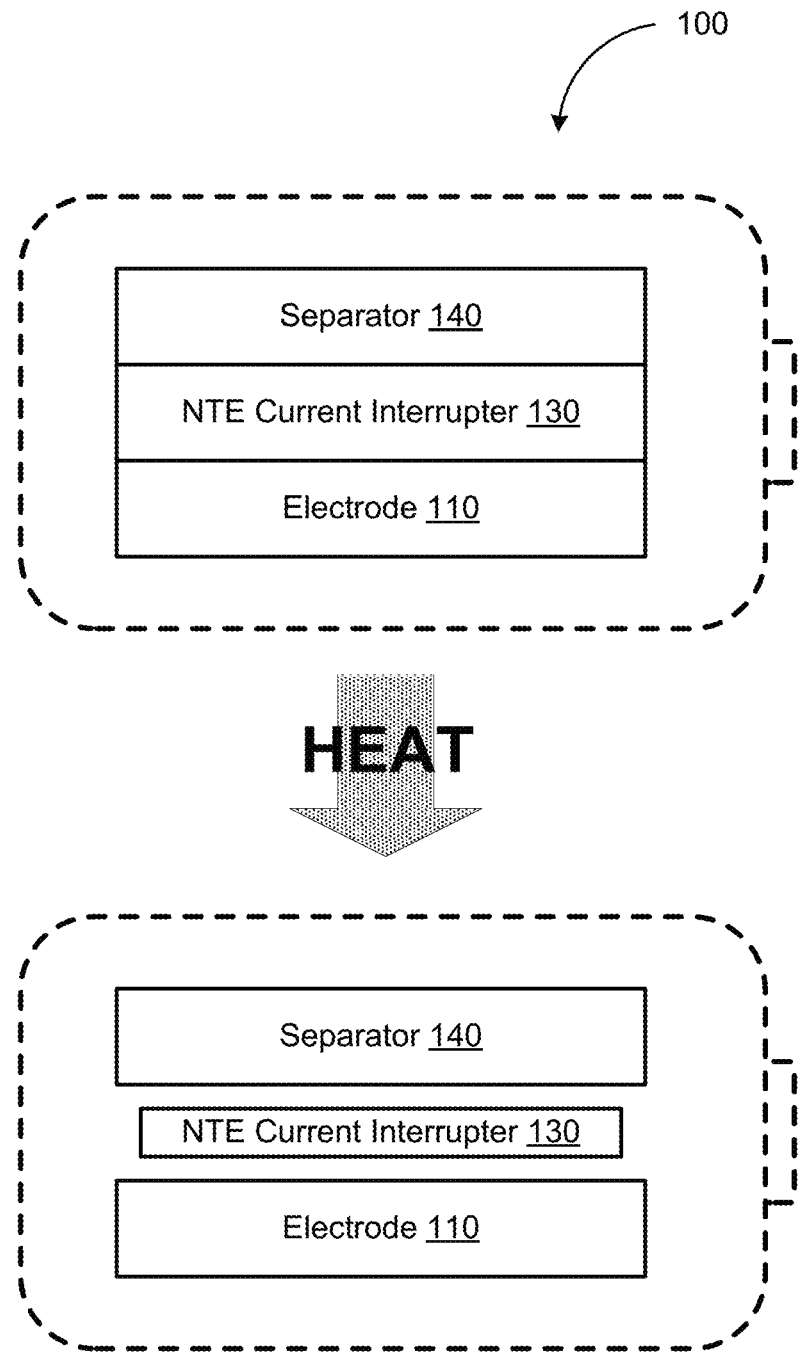
FIG. 2 depicts a schematic diagram illustrating another example of a battery cell having a negative thermal expansion component consistent with implementations of the current subject matter.

FIG. 2 depicts a schematic diagram illustrating an example of the battery cell 100 having a negative thermal expansion component consistent with implementations of the current subject matter. As shown in FIG. 2, the battery cell 100 can further include a separator 140 interposed between the two electrodes of the battery cell 100 including, for example, the electrode 110 and another electrode having an opposite polarity as the electrode 110. The electrode 110 can be an anode and/or a cathode of the battery cell 100. Although not shown in FIG. 2, the battery cell 100 can include another electrode as well as a current collector coupled with of the two electrodes.

As noted, the battery cell 100 can include the negative thermal expansion current interrupter 130. In some implementations of the current subject matter, the negative thermal expansion current interrupter 130 can be interposed between the electrode 110 and the separator 140 instead of and/or in addition to being interposed between the electrode 110 and the current collector 120. As shown in FIG. 2, subjecting the battery cell 100 to heat can cause the negative thermal expansion current interrupter 130 to contract. For example, the temperature of the battery cell 100 can increase when the battery cell 100 overcharges, overheats, and/or develops an internal short circuit. The negative thermal expansion current interrupter 130 can respond to the increase in temperature by contracting isotropically and/or anisotropically. For instance, the manner in which the negative thermal expansion current interrupter 130 contracts (e.g., isotropically and/or anisotropically) can depend on a design (e.g., dimensions, shape, and/or the like) of the negative thermal expansion current interrupter 130 and/or the materials used to form the negative thermal expansion current interrupter 130.

In some implementations of the current subject matter, the contraction of the negative thermal expansion current interrupter 130 can form a nonconductive gap between the electrode 110 and the separator 140. For example, the nonconductive gap can be formed when the contracting negative thermal expansion current interrupter 130 at least partially detaches from the electrode 110 and/or the separator 140, thereby electrically decoupling the electrode 110 and the separator 140. It should be appreciated that the nonconductive gap can be a partial and/or a full gap between the electrode 110 and the separator 140. Furthermore, the nonconductive gap can also be formed by gas and/or liquids released by the negative thermal expansion current interrupter 130. Alternatively and/or additionally, the nonconductive gap can be formed due a decomposition of the negative thermal expansion current interrupter 130. The presence of the nonconductive gap between the electrode 110 and the separator 140 can interrupt a flow of current through the battery cell 100, thereby neutralizing the risks associated with overcurrent.

In some implementations of the current subject matter, the negative thermal expansion current interrupter 130 can be formed from a material having negative thermal expansion properties including, for example, one or more oxides. For example, the negative thermal expansion current interrupter 130 can be formed from a silicate (e.g., $LiAlSiO_4$ (fl-eucryptite), $Li_2Al_2SinO_{4+2n}$ (β-spodumenes), $Mg_2Al_4Si_5O_{18}$ (cordierite), and/or the like), zirconium tungstate (e.g., $ZrW_2O_8$, $ZrW_2O_7$, and/or the like), cyanides (e.g., $Cd(CN)_2$, $ReO_3$, $(HfMg)(WO_4)_3$, and/or the like), ruthenate ($Ca_2RuO_{4-y}$), siliceous faujasite, $Fe_3Pt$, perovskite oxides (e.g., nickel-based perovskite oxide $Bi_{0.95}La_{0.05}NiO_3$ and/or the like), antiperovskites (e.g., $Ni_3AX$, $Ni_3MgC$, $Ni_3ZnN_{1-\delta}$, and/or the like), zeolites, samarium fulleride ($Sm_{2.75}C_{60}$), $LaCu_3Fe_4O_{12}$, invar alloys (e.g., Fe—Ni—Co and/or the like), metal oxides (e.g., $AM_2O_8$, $AM_2O_7$, $A_2M_3O_{12}$, and/or the like), low-dimensional materials (e.g., zero-dimensional fullerene and clusters, one-dimensional carbon nanotubes, and two-dimensional graphite and/or graphene, and/or the like), metal fluorides (e.g., $ScF_3$ and/or the like), mechanoresponsive polymers, porous polyacrylamide (PAAM), dibenzocyclooctadienes (DBCOD), a polyacrylamide film containing dibenzocyclooctadiene (DBCOD), and/or the like. Alternatively and/or additionally, the negative thermal expansion current interrupter 130 can be formed from a composite containing at least one negative thermal expansion material including, for example, $ZrW_2O_8$/copper, $ZrW_2O_8$/aluminum, $ZrW_2O_8$/phenolic resin, $ZrW_2O_8$/polyimide, β-eucryptite/copper, and/or the like. As noted, other examples of materials exhibiting negative thermal expansion properties are depicted in the table 1500 of FIG. 14.

Figure 3:
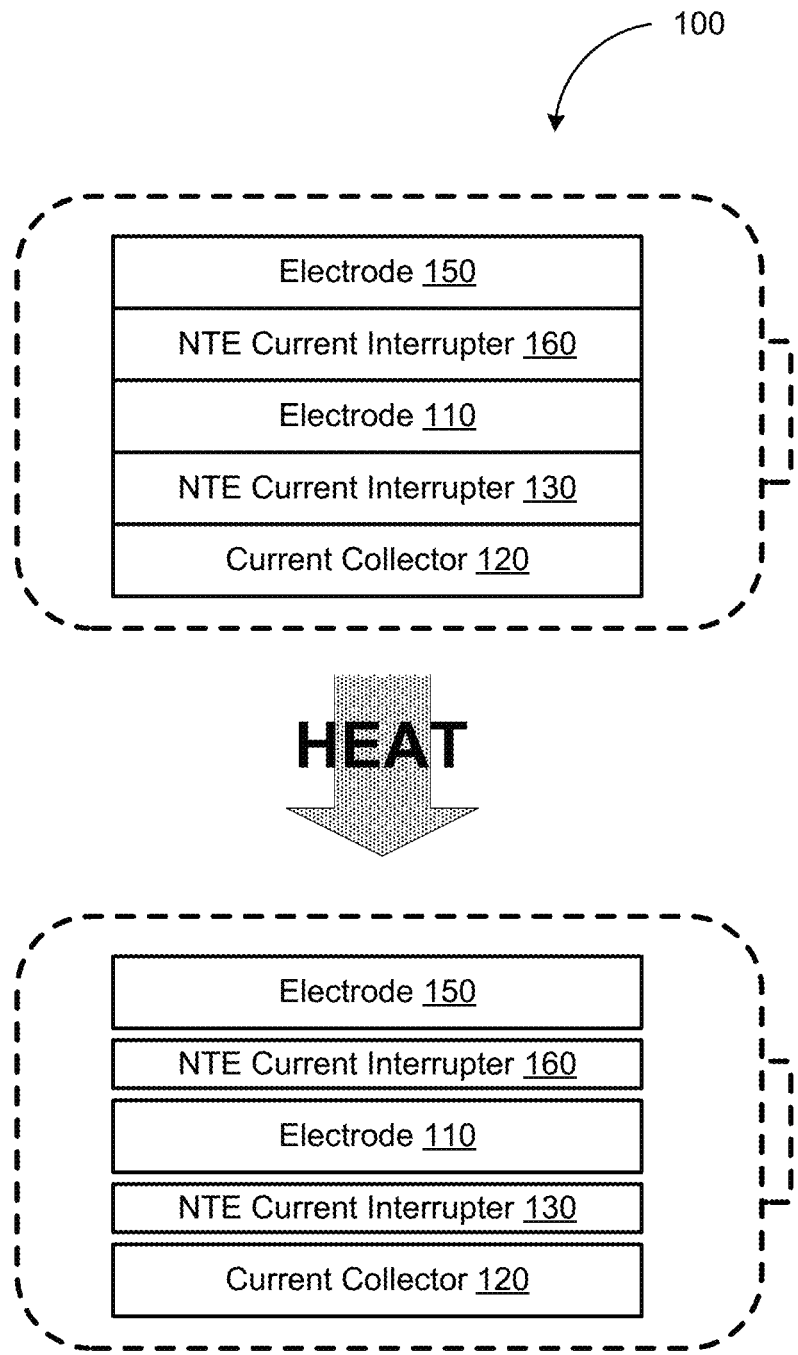
FIG. 3 depicts a schematic diagram illustrating another example of a battery cell having a negative thermal expansion component consistent with implementations of the current subject matter.

FIG. 3 depicts a schematic diagram illustrating an example of the battery cell 100 having a negative thermal expansion component consistent with implementations of the current subject matter. As shown in FIG. 3, the battery cell 100 can further include another electrode 150 having an opposite polarity as the electrode 110. Furthermore, in some implementations of the current subject matter, the negative thermal expansion component can include multiple negative thermal expansion current interrupters including, for example, the negative thermal expansion current interrupter 130 and another negative thermal expansion current interrupter 160. Although not shown, it should be appreciated that the battery cell 100 can include a separator interposed between the electrode 110 and the other electrode 150.

In some implementations of the current subject matter, the negative thermal expansion current interrupter 130 can be interposed between the electrode 110 and the current collector 120. Meanwhile, the other negative thermal expansion current interrupter 160 can be interposed between the two electrodes of the battery cell 100 including, for example, the electrode 110 and the other electrode 150. As shown in FIG. 3, subjecting the battery cell 100 to heat can cause the negative thermal expansion current interrupter 130 and/or the other negative thermal expansion current interrupter 160 to contract. For example, the temperature of the battery cell 100 can increase when the battery cell 100 overcharges, overheats, and/or develops an internal short circuit. The negative thermal expansion current interrupter 130 and/or the other negative thermal expansion current interrupter 160 can respond to the increase in temperature by contracting isotropically and/or anisotropically. It should be appreciated that the manner in which the negative thermal expansion current interrupter 130 and/or the other negative thermal expansion current interrupter 160 contract (e.g., isotropically and/or anisotropically) can depend on a design (e.g., dimensions, shape, and/or the like) and/or the materials forming the the negative thermal expansion current interrupter 130 and/or the other negative thermal expansion current interrupter 160.

In some implementations of the current subject matter, the contraction of the negative thermal expansion current interrupter 160 can form a nonconductive gap between the electrode 110 and the other electrode 150. Alternatively and/or additionally, the other negative thermal expansion current interrupter 130 can also contract to form an additional nonconductive gap between the electrode 110 and the current collector 120. These nonconductive gaps can also be formed by gas and/or liquids released by the negative thermal expansion current interrupter 130. Alternatively and/or additionally, the nonconductive gaps can be formed due a decomposition of the negative thermal expansion current interrupter 130. The presence of the nonconductive gaps can interrupt a flow of current through the battery cell 100, thereby neutralizing the risks that arise when the battery cell 100 overcharges, overheats, and/or develops an internal short circuit.

In some implementations of the current subject matter, the negative thermal expansion current interrupter 130 and/or the other negative thermal expansion current interrupter 160 can be formed from a material having negative thermal expansion properties including, for example, one or more oxides. For example, the negative thermal expansion current interrupter 130 can be formed from a silicate (e.g., $LiAlSiO_4$ (β-eucryptite), $Li_2Al_2SinO_{4+2n}$ (β-spodumenes), $Mg_2Al_4Si_5O_{18}$ (cordierite), and/or the like), zirconium tungstate (e.g., $ZrW_2O_8$, $ZrW_2O_7$, and/or the like), cyanides (e.g., $Cd(CN)_2$, $ReO_3$, $(HfMg)(WO_4)_3$, and/or the like), ruthenate ($Ca_2RuO_{4-y}$), siliceous faujasite, $Fe_3Pt$, perovskite oxides (e.g., nickel-based perovskite oxide $Bi_{0.95}La_{0.05}NiO_3$ and/or the like), antiperovskites (e.g., $Ni_3AX$, $Ni_3MgC$, $Ni_3ZnN_{1-\delta}$, and/or the like), zeolites, samarium fulleride ($Sm_{2.75}C_{60}$), $LaCu_3Fe_4O_{12}$, invar alloys (e.g., Fe—Ni—Co and/or the like), metal oxides (e.g., $AM_2O_8$, $AM_2O_7$, $A_2M_3O_{12}$, and/or the like), low-dimensional materials (e.g., zero-dimensional fullerene and clusters, one-dimensional carbon nanotubes, and two-dimensional graphite and/or graphene, and/or the like), metal fluorides (e.g., $ScF_3$ and/or the like), mechanoresponsive polymers, porous polyacrylamide (PAAM), dibenzocyclooctadienes (DBCOD), a polyacrylamide film containing dibenzocyclooctadiene (DB-COD), and/or the like. Alternatively and/or additionally, the negative thermal expansion current interrupter 130 and/or the other negative thermal expansion current interrupter 160 can be formed from a composite containing at least one negative thermal expansion material including, for example, $ZrW_2O_8$/copper, $ZrW_2O_8$/aluminum, $ZrW_2O_8$/phenolic resin, $ZrW_2O_8$/polyimide, β-eucryptite/copper, and/or the like. As noted, other examples of materials exhibiting negative thermal expansion properties are depicted in table 1500 of FIG. 14.

Figure 4A:
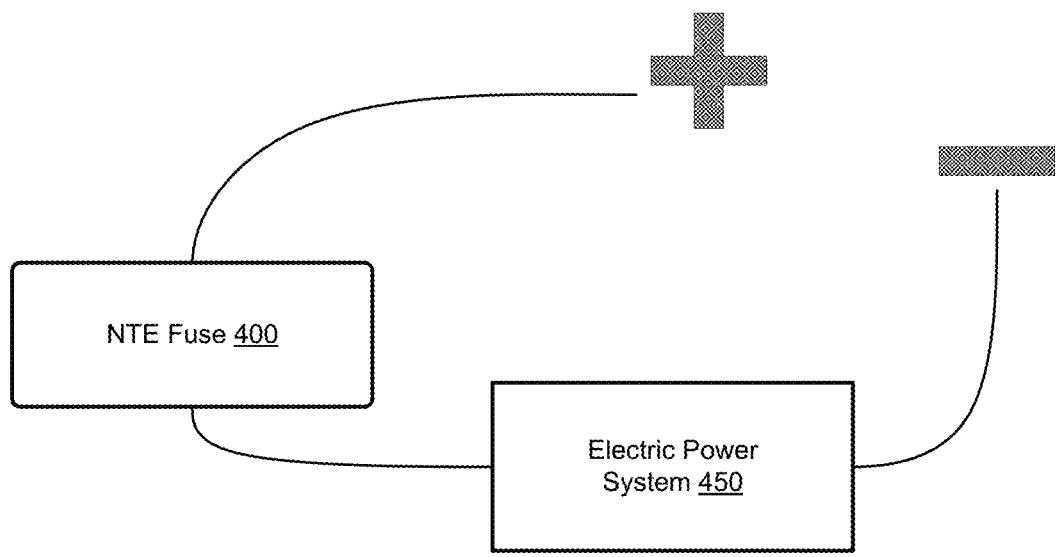
FIG. 4A depicts a schematic diagram illustrating a negative thermal expansion fuse coupled with an electric power system consistent with implementations of the current subject matter.

FIGS. 1-3 depicts a negative thermal expansion component that is integrated into an electric power system such as, for example, a battery cell, a battery pack, and/or the like. However, as noted, in some implementations of the current subject matter, a negative thermal expansion component can also be implemented as a fuse, which can be coupled to an exterior and/or an interior of an electric power system. To further illustrate, FIG. 4A depicts a schematic diagram illustrating a negative thermal expansion fuse 400 coupled with an electric power system 450 consistent with implementations of the current subject matter. As shown in FIG. 4A, the negative thermal expansion fuse 400 can be coupled to a positive terminal of the electric power system 450. However, it should be appreciated that the negative thermal expansion fuse 400 can also be coupled to a negative terminal of the electric power system 450. Furthermore, the electric power system 450 can be any type of electric power system including, for example, a circuit, an electric appliance, an electric generator, an energy storage system, and/or the like. For example, the electric power system 450 can be a battery, a converter (e.g., a DC/DC voltage converter, an AC/DC converter, a DC/AC converter, and/or the like), and/or the like. The negative thermal expansion fuse 400 can be installed between an electric generator (e.g, solar cell, solar panel, and/or the like) and an energy storage system containing rechargeable batteries, supercapacitors, flow batteries, fuel cells, and/or the like.

Figure 4B:
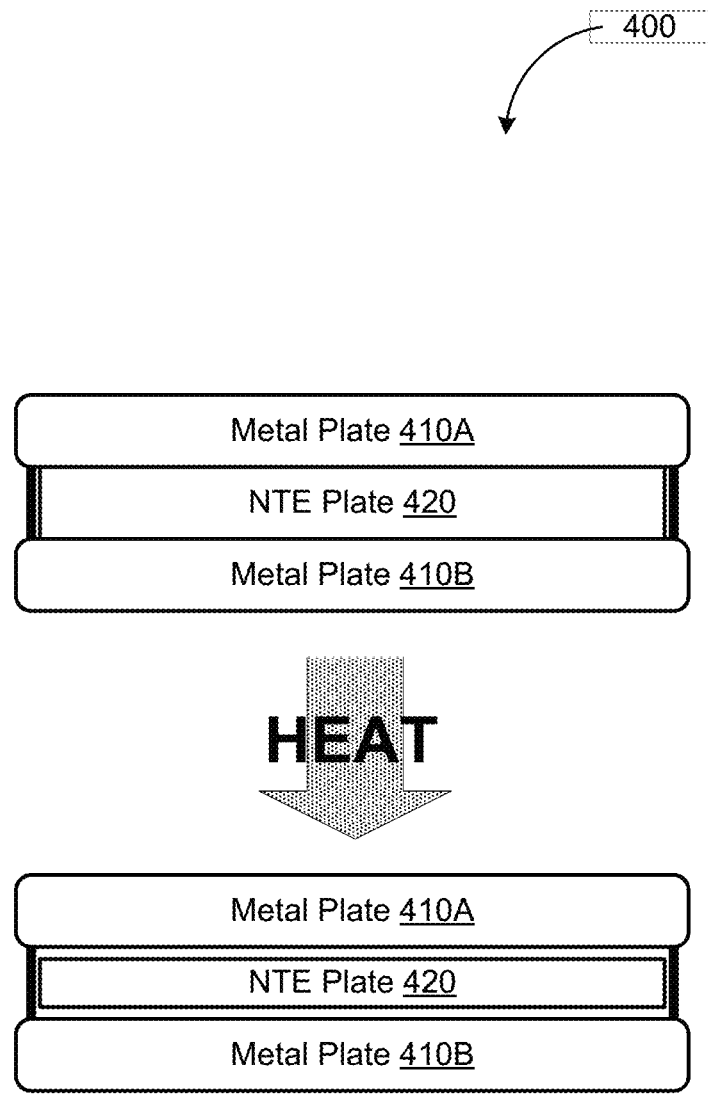
FIG. 4B depicts a cross sectional view an example of a negative thermal expansion fuse consistent with implementations of the current subject matter.
Figure 4C:
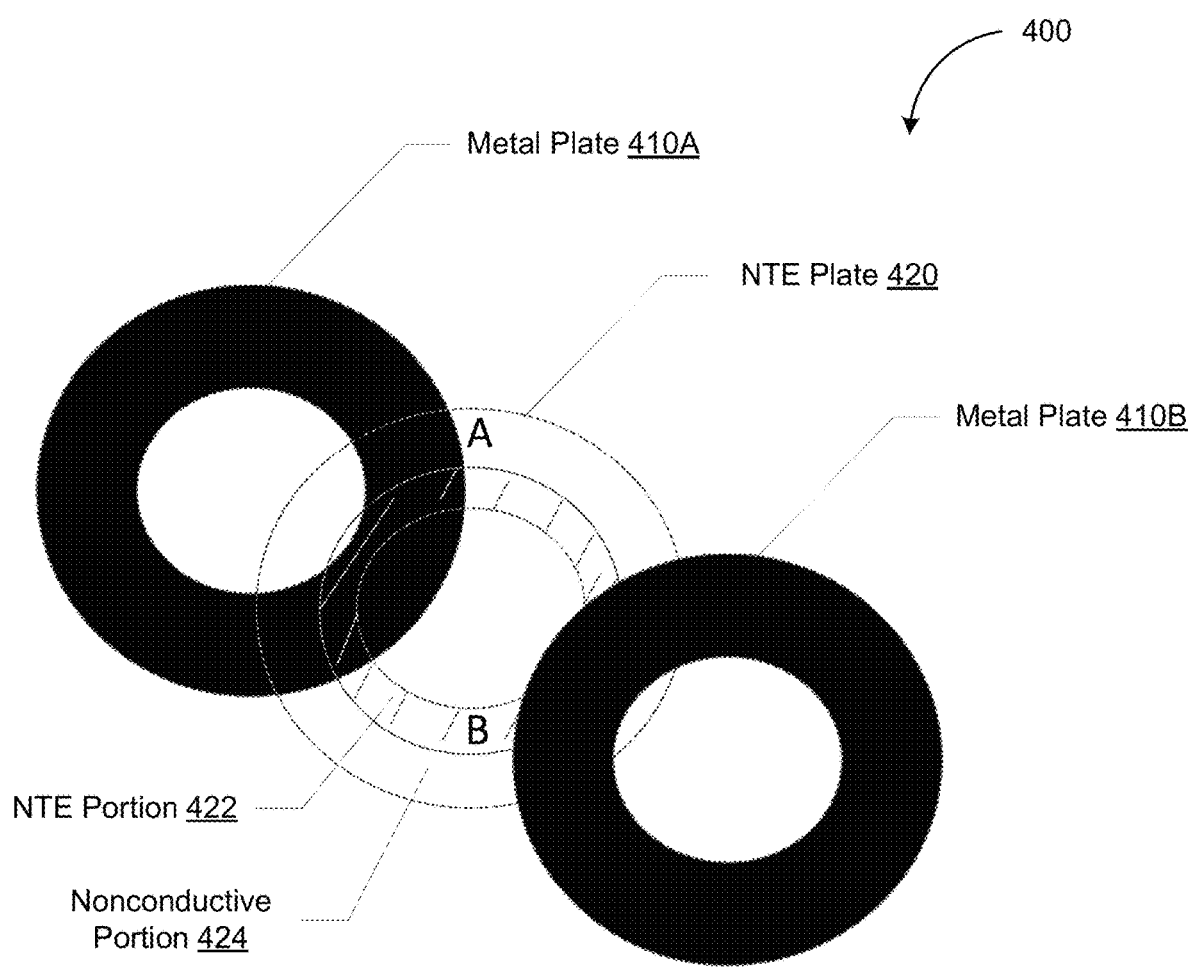
FIG. 4C depicts an exploded view of an example of a negative thermal expansion fuse consistent with implementations of the current subject matter.

FIG. 4B depicts a cross sectional view of an example of the negative thermal expansion fuse 400 consistent with implementations of the current subject matter. Meanwhile, FIG. 4C depicts an exploded view of an example of the negative thermal expansion fuse 400 consistent with implementations of the current subject matter. Referring to FIGS. 4A-C, the negative thermal expansion fuse 400 can include a first metal plate 410A and a second metal plate 410B. Furthermore, the negative thermal expansion fuse 400 can include a negative thermal expansion plate 420 interposed between the first metal plate 410A and the second metal plate 410B. Although FIG. 4C depicts the negative thermal expansion fuse 400 as having an annular and/or disk configuration, it should be appreciated that the negative thermal expansion fuse 400 can have a different shape and/or configuration than shown including, for example, triangular, rectangular, and/or the like.

In some implementations of the current subject matter, the first metal plate 410A and/or the second metal plate 410B can be formed from a metal such as, for example, nickel (Ni) and/or the like. Meanwhile, the negative thermal expansion plate 420 can be a hybrid negative thermal expansion component that includes a negative thermal expansion portion 422 and a nonconductive portion 424. According to some implementations of the current subject matter, the nonconductive portion 424 can be configured to provide structural support. Alternatively and/or additionally, the nonconductive portion 424 can be formed from any non-conducting material and/or non-conducting composite including, for example, non-conducting oxides (e.g., aluminum oxide, iron oxide, and/or the like), non-conducting ceramics (e.g., silicon oxide, boron glass, and/or the like), a non-conducting polymer (e.g., poly ethylene, polyvinylidene fluoride (PVDF), and/or the like), materials having a positive thermal coefficient (PTC), and/or the like. Where the nonconductive portion 424 of the negative thermal expansion plate 420 is formed from a positive temperature coefficient (PTC) material, the nonconductive portion 424 can undergo a phase transition when subject to temperature exceeding a threshold value.

The negative thermal expansion portion 422 can be formed from any material having negative thermal expansion properties including, for example, silicate (e.g., LiAlSiO$_4$ (β-eucryptite), Li$_2$Al$_2$SinO$_{4+2n}$ (β-spodumenes), Mg$_2$Al$_4$Si$_5$O$_{18}$ (cordierite), and/or the like), zirconium tungstate (e.g., ZrW$_2$O$_8$, ZrW$_2$O$_7$, and/or the like), cyanides (e.g., Cd(CN)$_2$, ReO$_3$, (HfMg)(WO$_4$)$_3$, and/or the like), ruthenate (Ca$_2$RuO$_{4-y}$), siliceous faujasite, perovskite oxides (e.g., nickel-based perovskite oxide Bi$_{0.95}$La$_{0.05}$NiO$_3$ and/or the like), antiperovskites (e.g., Ni$_3$AX, Ni$_3$MgC, Ni$_3$ZnN$_{1-\delta}$, and/or the like), zeolites, samarium fulleride (Sm$_{2.75}$C$_{60}$), LaCu$_3$Fe$_4$O$_{12}$, invar alloys (e.g., Fe—Ni—Co and/or the like), metal oxides (e.g., AM$_2$O$_8$, AM$_2$O$_7$, A$_2$M$_3$O$_{12}$, and/or the like), low-dimensional materials (e.g., zero-dimensional fullerene and clusters, one-dimensional carbon nanotubes, and two-dimensional graphite and/or graphene, and/or the like), metal fluorides (e.g., ScF$_3$ and/or the like), mechano-responsive polymers, porous polyacrylamide (PAAM), dibenzocyclooctadienes (DBCOD), a polyacrylamide film containing dibenzocyclooctadiene (DBCOD), and/or the like. Alternatively and/or additionally, the negative thermal expansion plate 420 can be formed from a composite containing at least one negative thermal expansion material including, for example, ZrW$_2$O$_8$/copper, ZrW$_2$O$_8$/aluminum, ZrW$_2$O$_8$/phenolic resin, ZrW$_2$O$_8$/polyimide, β-eucryptite/copper, and/or the like. As noted, table 1500 shown in FIG. 14 illustrates other examples of negative thermal expansion materials consistent with implementations of the current subject matter.

Referring again to FIG. 4B, the negative thermal expansion portion 422 of the negative thermal expansion plate 420 can contract when the negative thermal expansion fuse 400 is subject to heat. Alternatively and/or additionally, when the nonconductive portion 424 includes a positive temperature coefficient (PTC) material, the nonconductive portion 424 can undergo a phase transition when subject to temperature exceeding a threshold value. It should be appreciated that the nonconductive portion 424 can be formed from any positive temperature coefficient (PTC) material including, for example, poly ethylene, polyvinylidene fluoride (PVDF), acrylonitrile butadiene styrene (ABS) thermoplastic, glass and/or fiber-reinforced acrylonitrile butadiene styrene (ABS), acetal, amber, benzocyclobutene, cellulose acetate (CA), cellulose acetate butynate (CAB), cellulose nitrate (CN), chlorinated polyether, chlorinated polyvinylchloride (CPVC), ethylene ethyl acrylate (EEA), ethylene vinyl acetate (EVA), fluoroethylene propylene (FEP), fluorspar, CaF$_2$, gutta percha, nylon molding and/or extruding compound, paraffin, polybutylene (PB), polyamide (PA), polyester, polypropylene (PP), and/or the like.

The negative thermal expansion fuse 400 can be exposed to increased temperatures due to excess heat generated by a larger than intended current flows through the electric power system 450. In some implementations of the current subject matter, the negative thermal expansion portion 422 of the negative thermal expansion plate 420 can continue to contract as the temperature continues to increase. Meanwhile, the nonconductive portion 424 of the negative thermal expansion plate 420 can undergo a phase transition once the temperature reaches a threshold value. It should be appreciated that this phase transition can include a solid to liquid phase transition, a solid to gas phase transition, a liquid to gas transition, and/or the like. The nonconductive portion 424 can expand as a result of undergoing the phase transition.

The contraction of the negative thermal expansion portion 422 of the negative thermal expansion plate 420 can cause the negative thermal expansion plate 420 to at least partially detach from the first metal plate 410A and/or the second metal plate 410B, thereby creating a nonconductive gap between the first metal plate 410A and the second metal plate 410B. Alternatively and/or additionally, the expansion of the nonconductive portion 424 of the negative thermal expansion plate 420 can enlarge the nonconductive gap by further separating the negative thermal expansion plate 420 from the first metal plate 410A and/or the second metal plate 410B. The conductive gap between the first metal plate 410A and the second metal plate 410B can be a partial and/or a full gap. In some implementations of the current subject matter, this nonconductive gap between the first metal plate 410A and the second metal plate 410B can serve as a circuit breaker interrupting the flow of current through the electric power system 450. As such, the negative thermal expansion fuse 400 can eliminate the hazards that arise when the electric power system 450 is overheated, overcharged, and/or develops a short circuit.

Figure 5:
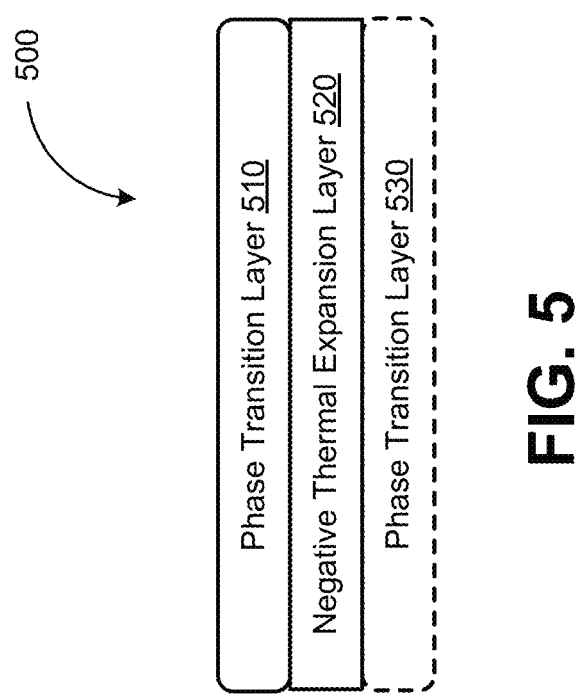
FIG. 5 depicts a schematic diagram illustrating a hybrid negative thermal expansion component consistent with implementations of the current subject matter.

FIG. 5 depicts a schematic diagram illustrating another example of a hybrid negative thermal expansion component 500 consistent with implementations of the current subject matter. Referring to FIGS. 1-3 and 4A-C, the hybrid negative thermal expansion component 500 can implement the negative thermal expansion current interrupter 130, the negative thermal expansion current interrupter 160, and/or the negative thermal expansion plate 420.

In some implementations of the current subject matter, the hybrid negative thermal expansion component 500 can include a phase transition layer 510 formed from a material that undergoes a phase transition when exposed to temperatures in excess of a threshold value. For example, when the phase transition layer 510 is exposed to temperatures in excess of the threshold value, the phase transition layer 510 can undergo a solid to liquid phase transition, a solid to gas phase transition, a liquid to gas transition, and/or the like. The phase transition can cause the phase transition layer 510 to expand in response to temperatures in excess of the threshold value. It should be appreciated that the phase transition layer 510 can be formed from any material that responds to being exposed to temperatures in excess of the threshold value by undergoing a phase transition. For instance, the phase transition layer 510 can be formed from a positive temperature coefficient (PTC) material such as, for example, poly ethylene, polyvinylidene fluoride (PVDF), acrylonitrile butadiene styrene (ABS) thermoplastic, glass and/or fiber-reinforced acrylonitrile butadiene styrene (ABS), acetal, amber, benzocyclobutene, cellulose acetate (CA), cellulose acetate butynate (CAB), cellulose nitrate (CN), chlorinated polyether, chlorinated polyvinylchloride (CPVC), ethylene ethyl acrylate (EEA), ethylene vinyl acetate (EVA), fluoroethylene propylene (FEP), fluorspar, $CaF_2$, gutta percha, nylon molding and/or extruding compound, paraffin, polybutylene (PB), polyamide (PA), polyester, polypropylene (PP), and/or the like.

In some implementations of the current subject matter, the phase transition layer 510 can be coupled with a negative thermal expansion layer 520. The negative thermal expansion layer 520 can be formed from a material having negative thermal expansion properties. As such, the negative thermal expansion layer 520 can contract when exposed to increasing temperatures. Furthermore, the contraction of the negative thermal expansion layer 520 can be continuous. That is, the negative thermal expansion layer 250 can continue to contract as the temperature continues to increase. By contrast, it should be appreciated that the phase transition layer 510 can undergo a single discrete phase transition at the threshold temperature.

In some implementations of the current subject matter, the negative thermal expansion layer 520 can be interposed between the phase transition layer 510 and another phase transition layer 530. However, it should be appreciated that the phase transition layer 530 is optional. Alternatively and/or additionally, the hybrid negative thermal expansion component 500 can include multiple layers of phase transition material and negative thermal expansion material. According to some implementations of the current subject matter, the negative thermal expansion layer 520 can contract in response to increasing temperatures whereas the phase transition layer 510 and/or the phase transition layer 530 can expand when the temperature exceeds a threshold value. The contraction of the negative thermal expansion layer 520 can form a nonconductive gap, which can be further enlarged by the expansion of the phase transition layer 510 and/or the phase transition layer 530.

Figure 6:
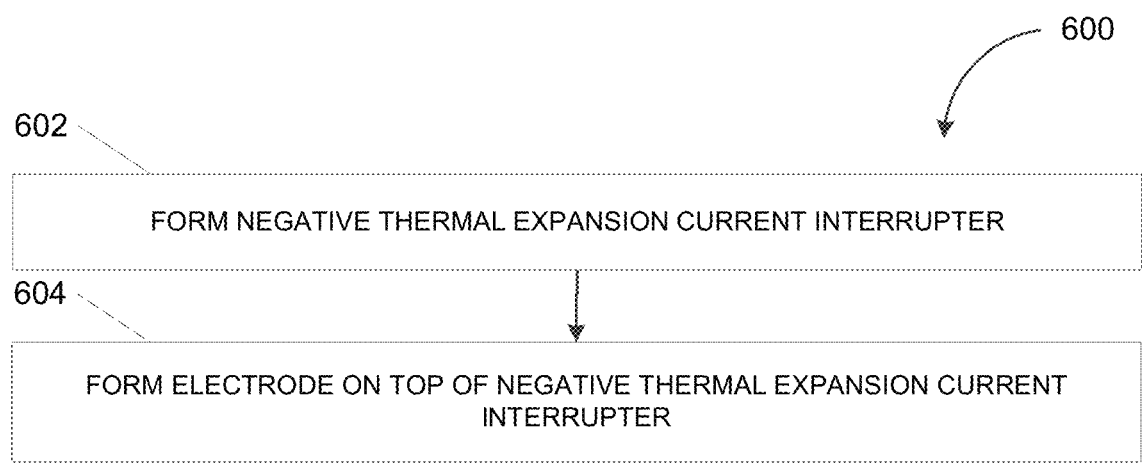
FIG. 6 depicts a flowchart illustrating a process for preparing an electrode layered with a negative thermal expansion component consistent with implementations of the current subject matter.

FIG. 6 depicts as flowchart illustrating a process 600 for preparing an electrode layered with a negative thermal expansion material consistent with implementations of the current subject matter. Referring to FIGS. 1-3 and 6, the process 600 can be performed to form the negative thermal expansion current interrupter 130 on top of the electrode 110.

The negative thermal expansion current interrupter 130 can be formed (602). For example, the negative thermal expansion current interrupter 130 can be formed by dissolving a binder into a solvent. A conductive additive and a negative thermal expansion material can be added to the binder solution to form a slurry. The slurry can be coated onto a surface of a metal foil. Drying the slurry can result in the formation of the negative thermal expansion current interrupter 130 on the surface of the metal foil.

The electrode 110 can be formed on top of the negative thermal expansion current interrupter 130 (604). For example, the electrode 110 can be formed by dissolving a binder into a solvent. A conductive additive can be added to the binder solution to form a slurry. Furthermore, active electrode material can be added to the slurry before the slurry is coated onto the negative thermal expansion current interrupter 130 formed in operation 602 and compressed into a desired thickness.

Figure 7:
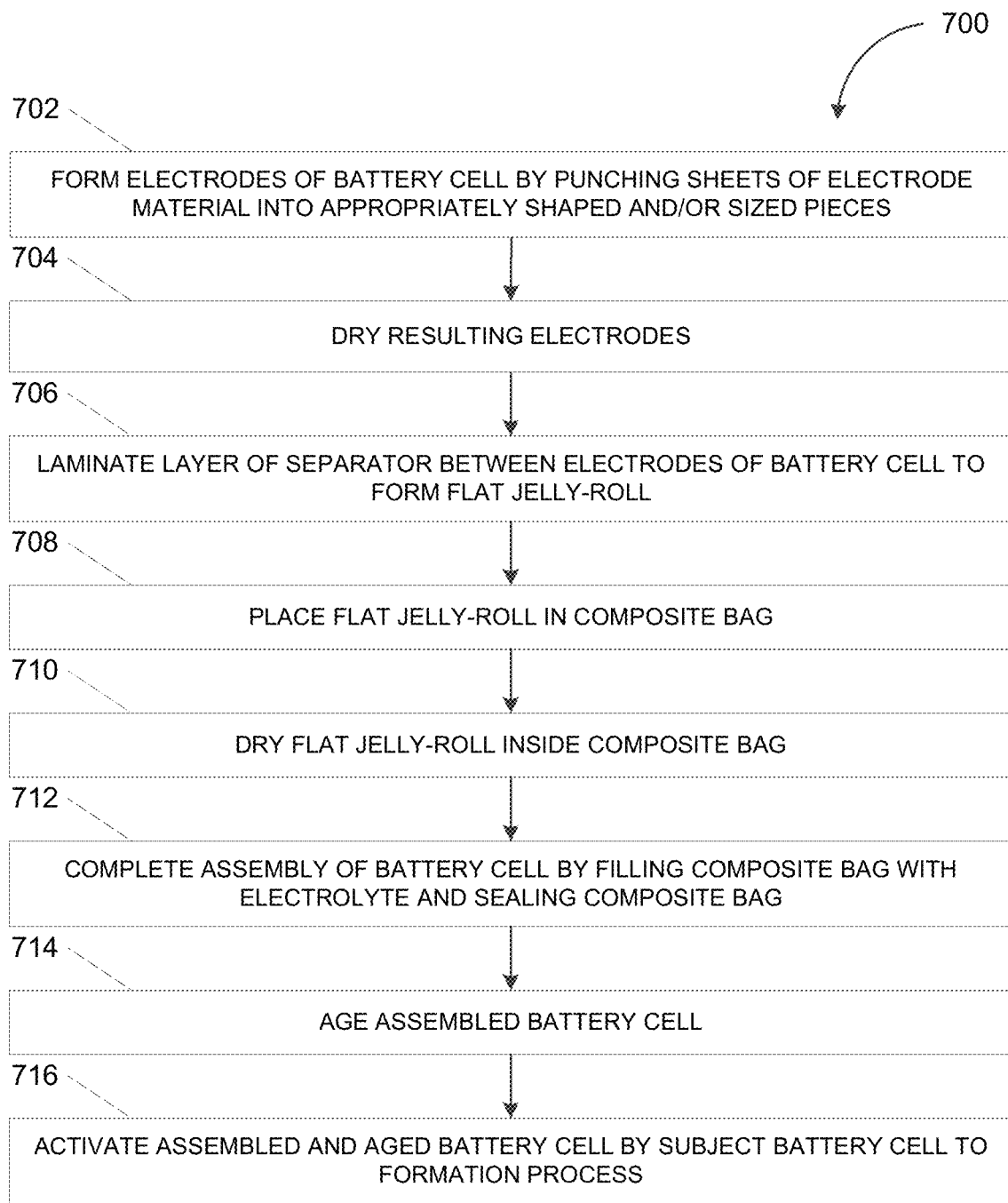
FIG. 7 depicts a flowchart illustrating a process for assembling a battery cell consistent with implementations of the current subject matter.

FIG. 7 depicts a flowchart illustrating a process 700 for assembling a battery cell consistent with implementations of the current subject matter. Referring to FIGS. 1-3 and 6-7, the process 600 can be performed to form the battery cell 100.

The electrodes of the battery cell can be formed by punching sheets of electrode material into appropriately shaped and/or sized pieces (702). For instance, sheets of cathode material and/or anode material can be punched into appropriately shaped and/or sized pieces using an electrode tab. The resulting electrodes can be dried (704). For example, the cathode of the battery cell can be dried at 125° C. for 10 hours while the anode of the battery cell can be dried at 140° C. for 10 hours.

A layer of separator can be laminated between the electrodes of the battery cell to form a flat jelly-roll (706). The flat jelly-roll can be placed in a composite bag (708). For instance, the flat jelly-roll formed in operation 706 can be placed inside an aluminum (Al) composite bag. The flat jelly-roll can be dried inside the composite bag (710). For example, the flat jelly-roll inside the aluminum (Al) composite bag can be dried at 70° C. for 10 hours. The composite bag can be filled with electrolyte and sealed to complete the assembly of the battery cell (712).

The assembled battery cell can be aged (714). For instance, the battery cell formed in operation 712 can be aged for 36 hours. The assembled and aged battery cell can be activated by subjecting the battery cell to a formation process (716). For example, the battery cell can undergo a formation process, which refers to a controlled charge and discharge cycle configured to activate the chemical components of the battery cell. This formation process can require the battery cell to be charged by being exposed to a gradually increasing current instead of a constant current such that the buildup of voltage within the battery cell is gradual. It should be appreciated that the battery cell can be ready for grading and/or use subsequent to the completion of the formation process.

Figure 10:
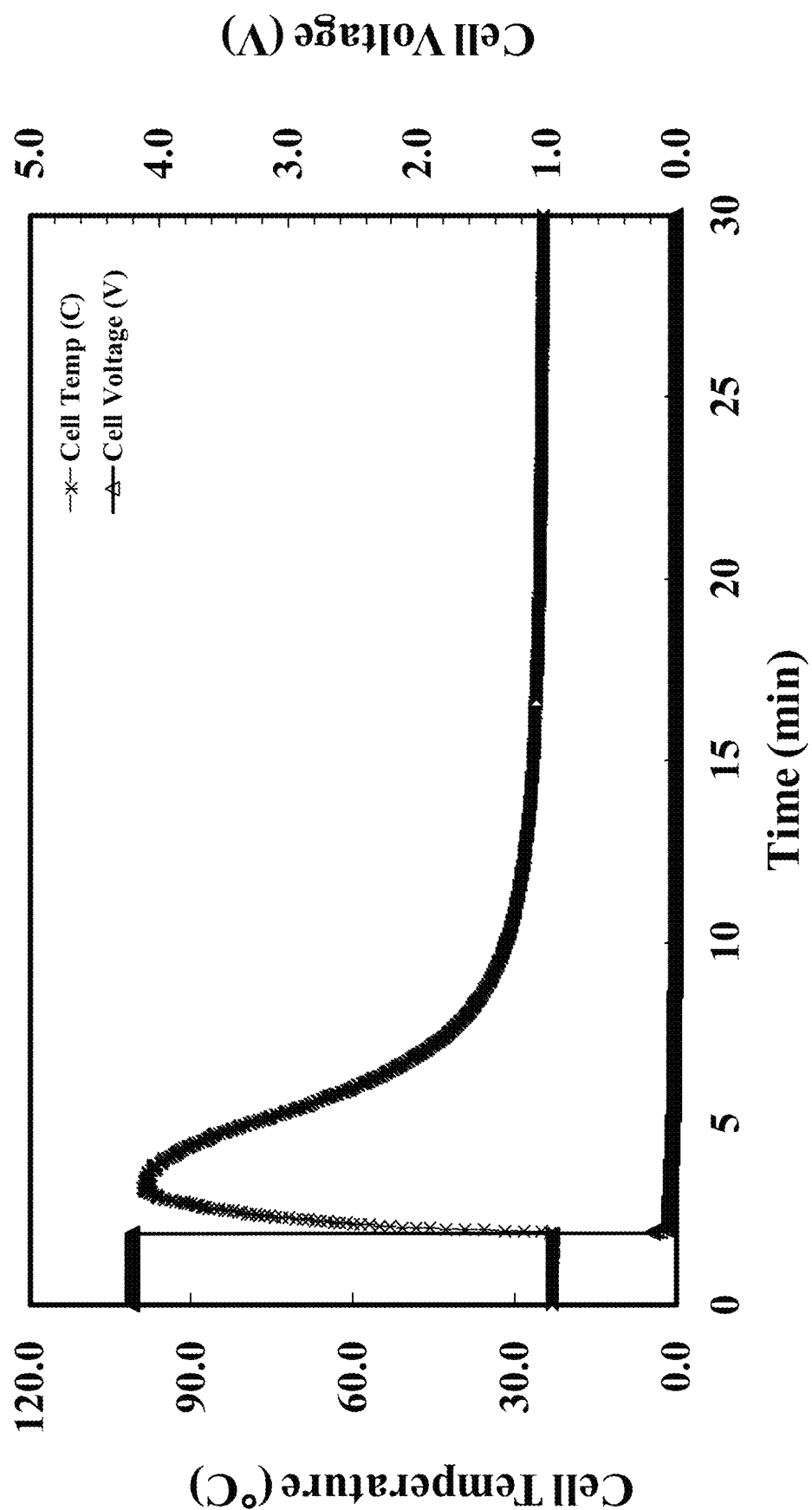
FIG. 10 depicts a table illustrating battery cell temperature and battery cell voltage measured during impact testing of a battery cell having a negative thermal expansion component consistent with implementations of the current subject matter.

In some implementations of the current subject matter, a battery cell having a negative thermal expansion component such as, for example, the battery cell 100 with the negative thermal expansion current interrupter 130 can be immune to the deleterious effects of overcharging, overheating, and/or internal short circuits. The negative thermal expansion component can contract in response to an increase in temperature, thereby forming one or more nonconductive gaps that interrupt the current flowing through the battery cell. As FIGS. 9 and 12 show, a battery cell having a negative thermal expansion component can have comparable capacity as a battery without a negative thermal expansion component. However, as shown in FIG. 10, including the negative thermal expansion component in the battery cell can prevent the battery cell from catching fire and/or exploding when subject to impact. For example, FIG. 10 shows that subjecting the battery cell to impact (e.g., from a 9.1 kilogram steel rod) can cause the voltage of the battery cell to decrease to approximately zero volts and the temperature of the battery cell to increase to approximately 100° C. Nevertheless, the battery cell, due to the presence of the negative thermal expansion component, did not catch fire and/or explode as a result of the impact.

Figure 11:
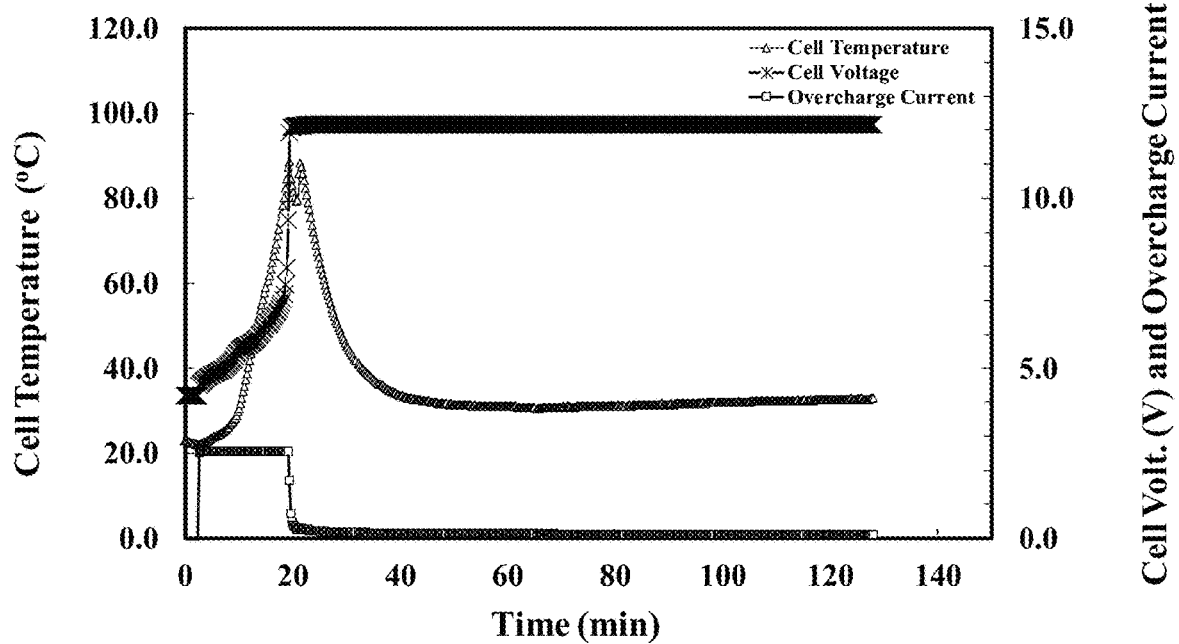
FIG. 11 depicts a table illustrating battery cell temperature and battery cell voltage measured during overcharge testing of a battery cell having a negative thermal expansion component consistent with implementations of the current subject matter.
Figure 13:
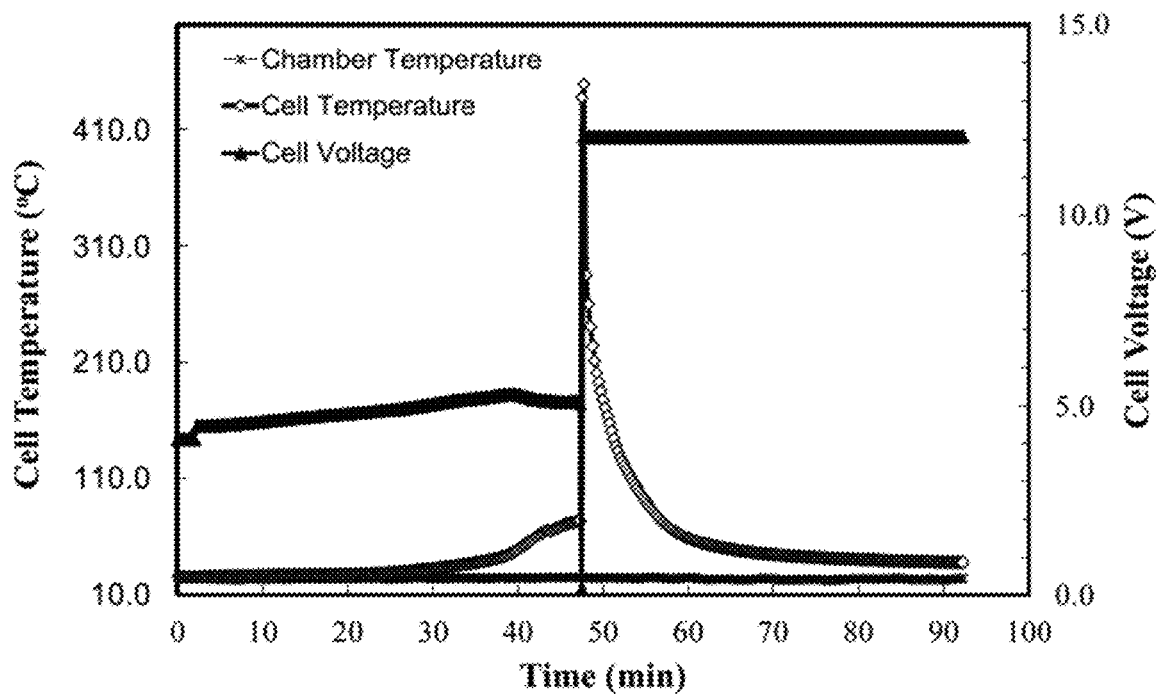
FIG. 13 depicts a table illustrating battery cell temperature and battery cell voltage measured during overcharge testing of a reference battery cell without a negative thermal expansion component consistent with implementations of the current subject matter.

Furthermore, as FIG. 11 shows, the battery cell having the negative thermal expansion component can withstand being overcharged without catching fire and/or exploding. For instance, FIG. 11 shows the voltage and the temperature of the overcharging battery cell spiking before tapering down and stabilizing after approximately 20 minutes, which indicates a rapid increase in the impedance within the battery cell at approximately the 20-minute mark. Contrastingly, FIG. 13 shows the temperature of an overcharging reference cell without a negative thermal expansion component gradually increasing until spiking to over 400° C. at the 48-minute mark, at which point the reference battery cell enters thermal runaway. FIG. 13 further shows the voltage of the reference battery cell as being relatively stable before spiking when the reference battery cell enters thermal runaway. Unlike the battery cell with the negative thermal expansion component, the impedance of the reference battery cell did not increase to thwart the reference battery cell from entering thermal runaway.

For example, a battery cell's response to impact can be tested by charging the battery cell to 4.2 volts (V) with a 1-ampere current for 3 hours. The fully charged battery cell can be placed on a hard surface. Furthermore, a thermal couple can be attached to a surface of the battery cell while a voltage meter can be coupled to the positive terminal and the negative terminal of the battery cell. A steel rode measuring 15.8 millimeters in diameter and 70 millimeters in length can be positioned across the center of the batter cell. The battery cell can then be subject to impact from a 9.1 kilogram (kg) steel block that is suspended at and released from a height of 610 millimeters above the battery cell. The battery cell's voltage and temperature can be recorded after the steel block is released for a free fall onto the steel bar positioned across the battery cell. A containment tube having an interior diameter of 8 centimeters (cm) can be used to guide the steel block in its free fall.

Example Battery Cell with Zirconium Tungstate Negative Thermal Expansion Component In some implementations of the current subject matter, a battery cell can include a negative thermal expansion component such as, for example, a negative thermal expansion current interrupter, formed from a zirconium tungstate (e.g., $ZrW_2O_8$, $ZrW_2O_7$, and/or the like). Furthermore, the battery cell can include a lithium (Li) nickel cobalt manganese (NMC) oxide cathode and an anode formed from mesocarbon microbeads (MCMB). According to some implementations of the current subject matter, the process 600 can be performed in order to prepare an electrode layered with zirconium tungstate as the negative thermal expansion material while the process 700 can be performed to order to assembly the battery cell.

In some implementations of the current subject matter, the negative thermal expansion component of the battery cell can be formed by dissolving 0.5 grams of Torlon® 4000TF (0.5 g) into 4.5 grams of N-methylpyrrolidone (NMP). Meanwhile, 3 grams of polyvinylidene fluoride (PVDF) can be dissolved into 34.5 grams of N-methylpyrrolidone (NMP). The Torlon® 4000TF solution and the polyvinylidene fluoride (PVDF) solution can be combined with 0.2 grams of carbon black and mixed for 10 minutes at a rate of approximate 6500 revolutions per minute. This mixture is then combined with 21.3 grams of nano zirconium tungstate powder (e.g., $ZrW_2O_8$, $ZrW_2O_7$, and/or the like) and mixed for 20 min at the rate of approximately 6500 revolutions per minute. The resulting slurry can be coated onto one side of a 15 millimeter thick aluminum (Al) foil using an automatic coating machine with the first heat zone set to approximately 130° C. and the second heat zone set to approximately 160° C. Once the N-methylpyrrolidone (NMP) has evaporated, the final dried solid can have a loading of approximately 0.7 milligrams per square centimeter ($mg/cm^2$).

In some implementations of the current subject matter, the cathode of the battery cell can be formed by dissolving 6 grams of polyvinylidene fluoride (PVDF) into 75 grams of N-methylpyrrolidone (NMP). The resulting mixture can be combined with 6 grams of carbon black and mixed for 15 minutes at a rate of approximately 6500 revolutions per minute (rpm). Here, 188 grams of nickel, manganese, and cobalt (NMC) can be added to the mixture and mixed for 30 minutes at a rate of approximately 6500 revolutions per minute (rmp). Some additional N-methylpyrrolidone (NMP) may be added to adjust the viscosity of the mixture. The resulting slurry can be coated onto the surface of the negative thermal expansion component using an automatic coating machine with the first heat zone set to about 85° C. and the second heat zone to about 135° C. Upon evaporating the N-methylpyrrolidone (NMP), the final dried solid can have a loading (single side) of approximately 19.4 milligrams per square centimeter ($mg/cm^2$). Furthermore, the final dried solid can be compressed to a thickness of approximately 119 microns (μm).

In some implementations of the current subject matter, the anode of the battery cell can be formed by dissolving 14 grams of carboxymethyl cellulose (CMC) into approximately 1077 grams of deionized water. The mixture can then be combined with 20 grams of carbon black and 8 gram of graphene before being mixed for 15 minutes at a rate of approximately 6500 revolutions per minute (rpm). Here, the mixture can be further combined with 744.2 grams of mesocarbon microbeads (MCMB) and 140 grams of synthetic graphite (TIMCAL) and mixed for 30 minutes at a rate of approximately 6500 revolutions per minute (rpm). In addition, 22 grams of styrene butadiene rubber (SBR) with a 50% solid content suspended in water and 3 grams of lithium neutralized polyimide can be added to the mixture and mixed for 5 minutes at approximately 6500 revolutions per minute (rpm). The viscosity of the resulting slurry can be adjusted before the slurry is coated onto a 9 millimeter thick copper (Cu) foil using an automatic coating machine with the first heat zone set to about 100° C. and the second heat zone to about 130° C. Once the water has been evaporated from the slurry coated atop the copper (Cu) foil, the final dried solid can have a loading of approximately 11.2 milligrams per square centimeter ($mg/cm^2$). Furthermore, the final dried solid can be compressed to a thickness of approximately 170 microns (μm).

In some implementations of the current subject matter, the battery cell can be assembled by forming the cathode and anode of the battery cell, for example, by punching sheets of the lithium (Li) nickel cobalt manganese (NMC) oxide cathode material and the mesocarbon microbead (MCMB) anode material into the appropriate shape and/or size using an electrode tab. The cathode can be dried at 125° C. for 10 hours while the anode can be dried at 140° C. for 10 hours. A separator can subsequently be laminated between the cathode and anode to form a flat jelly-roll. The flat jelly-roll can be placed into an aluminum (Al) composite bag and dried in a 70° C. vacuum oven. Thereafter, the aluminum (Al) composite bag can be filled with an organic carbonate based electrolyte containing lithium hexafluorophosphate ($LiPF_6$), sealed, and aged for 16 hours. The assembled and aged battery cell can be subject to a formation process that includes a charge and discharge cycle. For example, the battery cell can be charged to 4.2 volts first at a C-rate of 0.02C rate for 8 hours and then at a C-rate of 0.5C rate for 2 hours. The charged battery cell can be rested for 20 minutes before being discharged to 2.8 volts at a C-rate of 0.5C.

In some implementations of the current subject matter, upon completing the formation process, the battery cell can be punctured to release any gases that accumulated during the assembly process and resealed. The battery cell can then be ready for use and/or grading including, for example, impact testing, overcharge testing, discharge capacity testing, and/or the like.

Reference Battery Cell

A reference battery cell can be formed to serve as a control sample providing baseline performance statistics. The reference battery cell can be formed without a negative thermal expansion component and can therefore lack overcurrent protection. Furthermore, the reference battery cell can include a lithium (Li) nickel cobalt manganese (NMC) oxide cathode and a mesocarbon microbead (MCMB) anode.

In some implementations of the current subject matter, the cathode of the reference battery cell can be formed by dissolving 21 grams of polyvinylidene fluoride (PVDF) into 262.5 grams of N-methylpyrrolidone (NMP). Furthermore, 8.4 grams of carbon black can be added to the solution and mixed for 15 minutes at a rate of approximately 6500 revolutions per minute (rpm). The mixture can be combined with 570.6 grams of nickel, manganese, and cobalt (NMC) and mixed for 30 minutes at a rate of approximately 6500 revolutions per minute to form a flowable slurry. Additional N-methylpyrrolidone (NMP) can be added to the slurry to adjust the viscosity of the slurry before the slurry is coated onto 15 millimeter (mm) thick aluminum (Al) foil using an automatic coating machine. The first heat zone of the automatic coating machine can be set to approximately 80° C. and the second heat zone of the automatic coating machine can be set to approximately 130° C. to evaporate the N-methylpyrrolidone (NMP) from the slurry coated onto the aluminum (Al) foil. The resulting dried solid, which can have a loading of approximately 16.68 milligrams per square centimeter (mg/cm$^2$), can be compressed to a thickness of approximately 124 microns (μm).

In some implementations of the current subject matter, the anode of the reference battery cell can be formed by dissolving 13 grams of carboxymethyl cellulose (CMC) into approximately 764 grams of deionized water. The mixture can then be combined with 20 grams of carbon black and mixed for 15 minutes at a rate of approximately 6500 revolutions per minute (rpm). Here, the mixture can be further combined with 757.28 grams of mesocarbon microbeads (MCMB) and 188.72 grams of synthetic graphite (TIMCAL) and mixed for 30 minutes at a rate of approximately 6500 revolutions per minute (rpm). In addition, 21 grams of styrene butadiene rubber (SBR) with a 50% solid content suspended in water can be added to the mixture and mixed for 5 minutes at approximately 6500 revolutions per minute (rpm). The viscosity of the resulting slurry can be adjusted before the slurry is coated onto a 9 millimeter thick copper (Cu) foil using an automatic coating machine with the first heat zone set to about 95° C. and the second heat zone to about 125° C. Once the water has been evaporated from the slurry coated atop the copper (Cu) foil, the final dried solid, which can have a loading of approximately 11 milligrams per square centimeter (mg/cm$^2$), can be compressed to a thickness of approximately 149 microns (μm).

In some implementations of the current subject matter, the reference battery cell can be assembled by forming the cathode and anode of the reference battery cell, for example, by punching sheets of the lithium (Li) nickel cobalt manganese (NMC) oxide cathode material and mesocarbon microbead (MCMB) anode material into the approximate shape and/or size using an electrode tab. The cathode can be dried at 125° C. for 10 hours while the anode can be dried at 140° C. for 10 hours. A separator can subsequently be laminated between the cathode and anode to form a flat jelly-roll. The flat jelly-roll can be placed into an aluminum (Al) composite bag and dried in a 70° C. vacuum oven. Thereafter, the aluminum (Al) composite bag can be filled with an organic carbonate based electrolyte containing lithium hexafluorophosphate (LiPF$_6$), sealed, and aged for 16 hours. The assembled and aged battery cell can be subject to a formation process that includes a charge and discharge cycle. For example, the reference battery cell can be charged to 4.2 volts first at a C-rate of 0.02C rate for 8 hours and then at a C-rate of 0.5C rate for 2 hours. The charged battery cell can be rested for 20 minutes before being discharged to 2.8 volts at a C-rate of 0.5C.

In some implementations of the current subject matter, upon completing the formation process, the reference battery cell can be punctured to release any gases that accumulated during the assembly process and resealed. The reference battery cell can then be ready for use and/or grading including, for example, impact testing, overcharge testing, discharge capacity testing, and/or the like.

Figure 8:
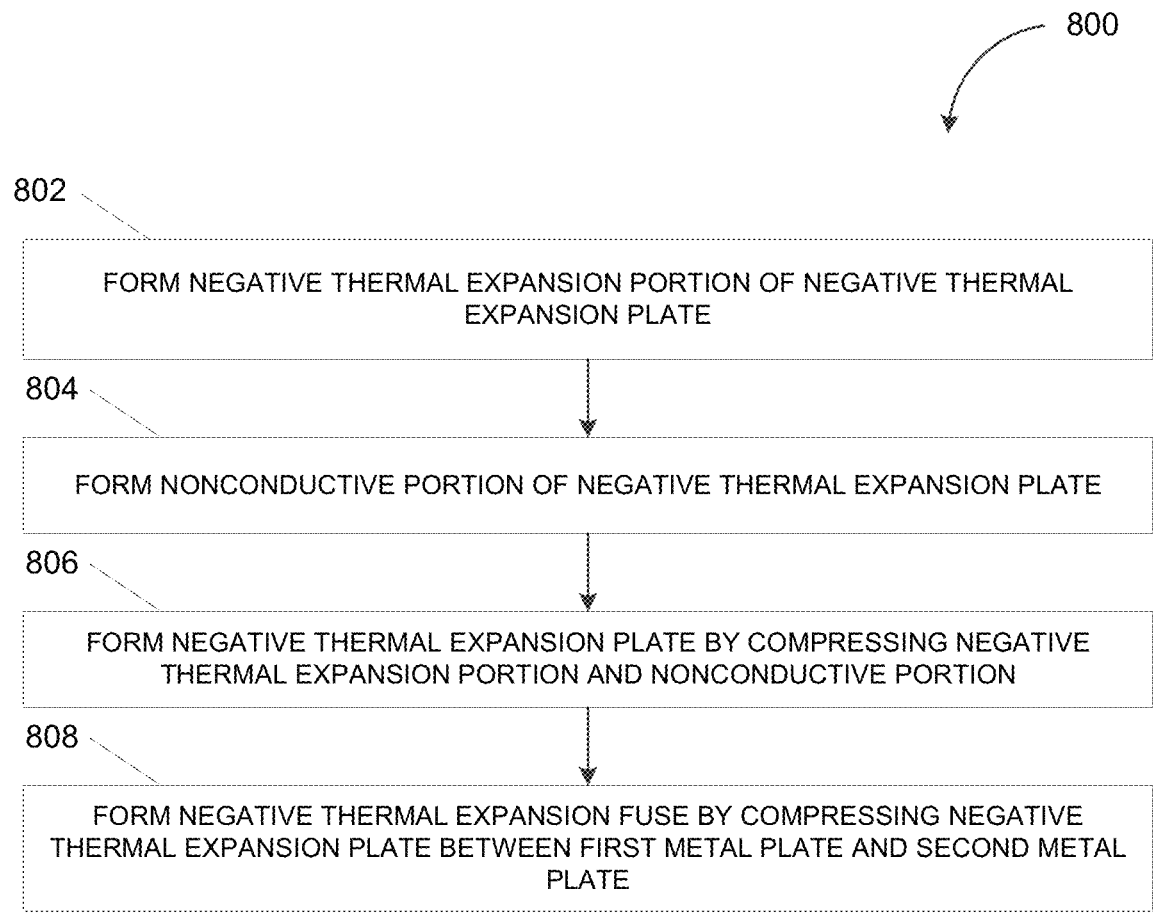
FIG. 8 depicts a flowchart illustrating a process for forming a negative thermal expansion fuse consistent with implementations of the current subject matter.

FIG. 8 depicts a flowchart illustrating a process 800 for forming a negative thermal expansion fuse consistent with implementations of the current subject matter. Referring to FIGS. 4A-C and 8, the process 800 can be performed in order to form the negative thermal expansion fuse 400 which, as noted, includes the negative thermal expansion plate 420 interposed between the first metal plate 410A and the second metal plate 410B.

The negative thermal expansion portion 422 of the negative thermal expansion plate 420 can be formed (802). For example, the negative thermal expansion portion 422 can be formed by dissolving 0.05 grams of polyvinylidene fluoride (PVDF) into 6 grams of N-methylpyrrolidone (NMP). The solution can be combined with 5 grams of a negative thermal expansion material and 1 gram of carbon black to form a paste. Furthermore, the paste can be dried at 100° C. for 24 hours. It should be appreciated that the paste can be dried into any shape and/or configuration including, for example, annular, rectangular, and/or the like.

The nonconductive portion 424 of the negative thermal expansion plate 420 can be formed (804). For example, the nonconductive portion 424 can be formed by mixing 5 grams of wax with 5 grams of polyvinylidene fluoride (PVDF). As noted, it should be appreciated that the nonconductive portion 424 can be formed to provide structural support and/or exhibit positive temperature coefficient (PTC) properties.

The negative thermal expansion portion 422 and the nonconductive portion 424 can be compressed to form the negative thermal expansion plate 420 (806). For example, the negative thermal expansion portion 422 and the nonconductive portion 424 can be loaded into a two-chamber die and compressed to form the negative thermal expansion plate 420.

The negative thermal expansion fuse 400 can be formed by compressing the negative thermal expansion plate 420 between first metal plate 410A and the second metal plate 410B (808). For example, the negative thermal expansion plate 420 can be interposed between the first metal plate 410A and the second metal plate 420, which can be nickel (Ni) plates having a thickness of approximately 0.2 millimeters (mm). Furthermore, the negative thermal expansion plate 420 interposed between the first metal plate 410A and the second metal plate 410B can be compressed at 60° C. to form the negative thermal expansion fuse 400.

In some implementations of the current subject matter, the negative thermal expansion fuse 400, which can be formed by performing the process 800, can be integrated into an electric power system such as, for example, the electric power system 450. Alternatively and/or additionally, the negative thermal expansion fuse 400 can be coupled to an electric power system via an external connection.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A battery, comprising:
  a first electrode;
  a current collector; and
  a first current interrupter, the first current interrupter comprising a first layer of a negative thermal expansion material interposed between the first electrode and the current collector, the first layer of the negative thermal expansion material being coated on the first electrode or the current collector, and the first current interrupter configured to contract in response to an increase in temperature, the contraction of the first current interrupter forming, between the first electrode and the current collector, a nonconductive gap that disrupts a current flow within the battery.

2. The battery of claim 1, wherein the formation of the nonconductive gap disrupts the current flow at least by electrically decoupling the first electrode and the current collector.

3. The battery of claim 1, wherein the battery further comprises a second electrode and a second current interrupter, wherein the second current interrupter comprises a second layer of the negative thermal expansion material interposed between the first electrode and the second electrode, wherein the second current interrupter is configured to contract in response to the increase in temperature, and wherein the contraction of the second current interrupter forms, between the first electrode and the second electrode, another nonconductive gap that disrupts the current flow within the battery at least by electrically decoupling the first electrode and the second electrode.

4. The battery of claim 3, wherein the battery further comprises a separator interposed between the first electrode and the second electrode.

5. The battery of claim 1, wherein the negative thermal expansion material comprises one or more oxides.

6. The battery of claim 1, wherein the negative thermal expansion material comprises a silicate, a zirconium tungstate, a cyanide, a ruthenate, a siliceous faujasite, Fe Pt, a perovskite oxides, an antiperovskite, a zeolite, a samarium fulleride, $LaCu_3Fe_4O_{12}$, an invar alloy, a metal oxide, a low-dimensional material, a metal fluoride, a mechanoresponsive polymer, a porous polyacrylamide, a dibenzocyclooctadiene, and/or a polyacrylamide film containing dibenzocyclooctadiene.

7. The battery of claim 1, wherein the negative thermal expansion material comprises a composite of one or more negative thermal expansion materials.

8. The battery of claim 1, wherein the first electrode comprises a cathode or an anode of the battery.

9. The battery of claim 1, wherein the first electrode comprises lithium (Li).

* * * * *